United States Patent
Soltan et al.

(10) Patent No.: US 11,981,603 B2
(45) Date of Patent: May 14, 2024

(54) SELF-REINFORCED CEMENTITIOUS COMPOSITE COMPOSITIONS FOR BUILDING-SCALE THREE DIMENSIONAL (3D) PRINTING

(71) Applicant: THE REGENTS OF THE UNIVERSITY OF MICHIGAN, Ann Arbor, MI (US)

(72) Inventors: Daniel G. Soltan, Ann Arbor, MI (US); Victor C. Li, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 140 days.

(21) Appl. No.: 16/760,706

(22) PCT Filed: Oct. 31, 2018

(86) PCT No.: PCT/US2018/058480
§ 371 (c)(1),
(2) Date: Apr. 30, 2020

(87) PCT Pub. No.: WO2019/089771
PCT Pub. Date: May 9, 2019

(65) Prior Publication Data
US 2020/0331165 A1   Oct. 22, 2020

Related U.S. Application Data

(60) Provisional application No. 62/579,567, filed on Oct. 31, 2017.

(51) Int. Cl.
| | |
|---|---|
| *B28B 1/00* | (2006.01) |
| *B28B 1/52* | (2006.01) |
| *B33Y 10/00* | (2015.01) |
| *B33Y 70/10* | (2020.01) |
| *B33Y 80/00* | (2015.01) |

(Continued)

(52) U.S. Cl.
CPC .............. *C04B 28/02* (2013.01); *B28B 1/001* (2013.01); *B28B 1/525* (2013.01); *B33Y 10/00* (2014.12); *B33Y 70/10* (2020.01); *B33Y 80/00* (2014.12); *C04B 14/062* (2013.01); *C04B 14/102* (2013.01); *C04B 16/02* (2013.01); *C04B 16/0641* (2013.01); *C04B 20/008* (2013.01); *C04B 28/04* (2013.01); *C04B 28/06* (2013.01); *C04B 2103/302* (2013.01); *C04B 2111/00129* (2013.01); *C04B 2111/00181* (2013.01); *C04B 2111/50* (2013.01)

(58) Field of Classification Search
CPC .......... B28B 1/001; B28B 1/525; B28B 1/00; B28B 1/52; B33Y 10/00; B33Y 70/10; B33Y 80/00; B33Y 70/00; C04B 14/062; C04B 14/102; C04B 16/02; C04B 16/0641; C04B 20/008; C04B 28/04; C04B 28/06; C04B 2103/302; C04B 2111/00129; C04B 2111/00181; C04B 2111/50; C04B 2201/50; C04B 111/27; C04B 16/06; C04B 38/00; C04B 38/08; C04B 16/08; C04B 28/02; C04B 28/24; C04B 14/06; C04B 14/10; C04B 20/00; Y02W 30/91
See application file for complete search history.

(56) References Cited

U.S. PATENT DOCUMENTS 2,410,954 A * 11/1946 James ................... C04B 18/146
106/737
5,614,307 A * 3/1997 Andersen ............ B29C 44/3402
428/294.7

(Continued)

FOREIGN PATENT DOCUMENTS

AU       2004278353 A1    4/2005
CN        102518275 A     6/2012

(Continued)

OTHER PUBLICATIONS

Kazemian et al. "Cementitious materials for construction-scale 3D printing: Laboratory testing of fresh printing mixture." Construction and Building Materials, 145 (2017), pp. 639-647; (Published online Apr. 20, 2017) DOI: 10.1016/j.conbuildmat.2017.04.015 (Year: 2017).*
Per Fidjestøl, Robert Lewis, 12—Microsilica as an Addition, Ed: Peter C. Hewlett, Lea's Chemistry of Cement and Concrete (4th ed) , Butterworth-Heinemann, 1998, pp. 679-712, ISBN 9780750662567, DOI: 10.1016/B978-075066256-7/50024-2 (Year: 1998).*
Patel Superplasticizer (High Range Water Reducer): For High-Performance Concrete) [retrieved from internet at Apr. 16, 2022 <URL:https://gharpedia.com/blog/superplasticizer-high-range-water-reducer/>] (Year: 2018).*

(Continued)

*Primary Examiner* — Anthony J Green
*Assistant Examiner* — Marites A Guino-O Uzzle
(74) *Attorney, Agent, or Firm* — Harness, Dickey & Pierce, P.L.C.

(57) ABSTRACT

Printable cementitious compositions for additive manufacturing are provided, that have a fresh state and a hardened state. In fresh state, the composition is flowable and extrudable in the additive manufacturing process. In the hardened state, the composition exhibits strain hardening. In one variation, the strain hardening is represented by a uniaxial tensile strength of ≥about 2.5 MPa, a tensile strain capacity of ≥about 1%, and a compressive strength at 100 hours of ≥about 20 MPa. In other variations, the composition includes Portland cement, a calcium aluminate cement, a fine aggregate, water, a high range water reducing agent (HRWRA), and a polymeric fiber, as well as one or more optional components selected from: fly ash, silica flour, microsilica, attapulgite nanoclay, and/or hydroxypropylmethyl cellulose (HPMC). Methods of additive manufacturing with such compositions are also provided.

10 Claims, 13 Drawing Sheets

(51) Int. Cl.
| | |
|---|---|
| C04B 14/06 | (2006.01) |
| C04B 14/10 | (2006.01) |
| C04B 16/02 | (2006.01) |
| C04B 16/06 | (2006.01) |
| C04B 20/00 | (2006.01) |
| C04B 28/02 | (2006.01) |
| C04B 28/04 | (2006.01) |
| C04B 28/06 | (2006.01) |
| C04B 103/30 | (2006.01) |
| C04B 111/00 | (2006.01) |
| C04B 111/50 | (2006.01) |

(56) References Cited

U.S. PATENT DOCUMENTS

| | | | |
|---|---|---|---|
| 6,694,690 B2 | 2/2004 | Li et al. | |
| 6,809,131 B2 | 10/2004 | Li et al. | |
| 6,969,423 B2 | 11/2005 | Li et al. | |
| 7,169,224 B2 | 1/2007 | Li et al. | |
| 7,241,338 B2 | 7/2007 | Li et al. | |
| 7,572,501 B2 | 8/2009 | Li et al. | |
| 7,799,127 B2 | 9/2010 | Li et al. | |
| 9,260,347 B2 | 2/2016 | Li et al. | |
| 9,493,378 B2 | 11/2016 | Durante et al. | |
| 9,512,344 B2 | 12/2016 | Li et al. | |
| 2002/0179219 A1* | 12/2002 | Naji | E04F 15/12 156/45 |
| 2005/0066858 A1* | 3/2005 | Li | C04B 28/04 106/737 |
| 2013/0012625 A1 | 1/2013 | Li et al. | |
| 2013/0273319 A1 | 10/2013 | Chen et al. | |
| 2017/0334781 A1 | 11/2017 | Yang et al. | |
| 2018/0016752 A1 | 1/2018 | Li et al. | |
| 2018/0029011 A1 | 2/2018 | Jensen et al. | |

FOREIGN PATENT DOCUMENTS

| | | |
|---|---|---|
| CN | 103387353 A | 11/2013 |
| CN | 104129951 A | 11/2014 |
| CN | 104891891 A | 9/2015 |
| CN | 105731942 A | 7/2016 |
| CN | 106186974 A | 12/2016 |
| CN | 106242398 A | 12/2016 |
| CN | 106545142 A | 3/2017 |
| JP | 5128129 B2 | 1/2013 |
| WO | WO-2016130637 A1 | 8/2016 |
| WO | 2017184087 A1 | 10/2017 |

OTHER PUBLICATIONS

Poly(vinylalcohol) [retrieved from internet at Apr. 19, 2022 <URL:https://polymerdatabase.com/polymers/polyvinylalcohol.html>] (Year: 2015).*

S Kawashima, M Chaouche, D Corr, S Shah, Rate of thixotropic rebuilding of cement pastes modified with highly purified attapulgite clays, Cement and Concrete Research, v 53, 2013, pp. 112-118. DOI: 10.1016/j.cemconres.2013.05.019. (Year: 2013).*

Morsy, M. S., S. H. Alsayed, and M. Aqel. "Effect of elevated temperature on mechanical properties and microstructure of silica flour concrete." International journal of civil & environmental engineering 10.1 (2010): 1-6. (Year: 2010).*

Morsy, Mohamed et al. "Effect of Elevated Temperature on Compressive Strength of Blended Cement Mortar." (2008). (Year: 2008).*

B. Lu, M. Li, W. Lao, Y. Weng, S. Qian, M.J. Tan, K.F. Leong. Effect of spray-based printing parameters on cementitious material distribution. Proc. 29th Annu. Int. Solid Free. Fabr. Symp.—An Addit. Manuf. Conf.: 1989-2002, 2018 (Year: 2018).*

Extended Search Report from European Patent Office corresponding to EP 18874276 dated Jun. 18, 2021.

Curosu Iurie, et al.: "Performance of various strain-hardening cement-based composites (SHCC) subject to uniaxial impact tensile loading", Cement and Concrete Research, vol. 102, Aug. 16, 2017 (Aug. 16, 2017), pp. 16-28, XP085238175, ISSN: 0008-8846, DOI: 10.1016/J.CEMCONRES.2017.08.008 * Section2.2; tables 2,3,4 * Curosu Iurie hardening SHCC) 16), DOI: J.CEMCONRES.2017. 08.008.

Chinese Office Action dated Apr. 23, 2021 for corresponding Chinese Application 2018800782363, and English translation (30 pages).

Kazemian, Ali et al., "Cementitious materials for construction-scale 3D printing: Laboratory testing of fresh printing mixture." Construction and Building Materials, 145 (2017), pp. 639-647; (Published online Apr. 20, 2017) DOI: 10.1016/i.conbuilding.2017.04. 015.

Rushing, Todd S. et al., "Investigation of concrete mixtures for additive construction," Rapid Prototyp. J., vol. 23 Issue: 1 (Jan. 16, 2017) pp. 74-80.

Soltan, Daniel G. et al., "A self-reinforced cemintitious composite for building-scale 3-D printing," Cement and Concrete Composites (2018); DOI: 10.1016/j.cemconcomp.2018.03.017.

International Search Report and Written Opinion for International Application No. PCT/US2018/058450 dated Mar. 4, 2019, 11 pages (ISA/US).

Abbas, Ghulam et al., "Hydroxyproylmethylcellulose as a primary viscosifying agent in cement slurry at high temperature," International Journal of Automotive and Mechanical Engineering,, vol. 8, pp. 1218-1225; (Jul.- Dec. 2013) DOI: 10.15282/ijame.8.2013.12. 0100.

Bos, Freek et al., "Additive manufacturing of concrete in construction: potentials and challenges of 3D concrete printing," Virtual and Phys. Prototyping, 11 (3), pp. 209-225; (Published online: Aug. 2, 2016) DOI: 10.1080/17452759.2016.1209867.

Buswell, R. A. et al., "Freeform Construction: Mega-Scale Rapid Manufacturing for Construction," Automation in Construction, 16 (2), pp. 224-231; (Published online: Jun. 30, 2006) DOI: 10.1016/ j.autcon.2006.05.002.

Guo, Ming-Zhi et al., "Superior photocatalytic NOx removal of cementitious materials prepared with white cement over ordinary Portland cement and the underlying mechanisms," Cement and Concrete Composites (2018), vol. 90, pp. 42-49; (Published online: Mar. 22, 2018) DOI: 10.1016/j.cemconcomp.2018.03.020.

Hambach, Manuel et al., "Properties of 3D-printed fiber-reinforced Portland cement paste," Cement and Concrete Composites, 79, pp. 62-70; (Publsihed online: Feb. 10, 2017) DOI: 10.1016/j.cemconcomp. 2017.02.001.

Hariharan, A.R. et al., "Study on Strength Development of High Strength Concrete Containing Fly ash and Silica fume," International Journal of Engineering Science and Technology, 3, pp. 2955-2961; (Published Apr. 2011).

Hwang, Dooil et al., "An Innovative Construction Process— Contour Crafting (CC)," Proceedings of the 22nd International Symposium on Automation and Robotics in Construction ISARC 2005, Ferrara, Italy, (Sep. 11-15, 2005).

Japan Society of Civil Engineers, "Recommendations for Design and Construction of High Performance Fiber Reinforced Cement Composites with Multiple Fine Cracks (HPFRCC)," Concrete Engineering Series 82 (Mar. 2008).

Kawashima, Shiho et al., "Influence of purified attapulgite clays on the adhesive properties of cement pastes as measured by the tack test," Cement & Concrete Composites, 48, pp. 35-41; (Published online: Jan. 24, 2014) DOI: 10.1016/j.cemconcomp.2014.01.005.

Kawashima, Shiho et al., "Rate of thixotropic rebuilding of cement pastes modified with highly purified attapulgite clays," Cement and Concrete Research, 53 (2013), pp. 112-118; DOI: 10.1016/j.cemconres. 2013.05.019.

Keating, Steven J. et al., "Toward site-specific and self-sufficient robotic fabrication on architectural scales", Sci. Robot., 2, eaam8986 (Published Apr. 26, 2017).

Kim, Yun Yong et al., "Design of Engineered Cementitious Composite Suitable for Wet-Mixture Shotcreting," ACI Mater. J., 100 (6), pp. 511-518; (Published Nov. 1, 2003).

(56) References Cited

OTHER PUBLICATIONS

Kirca, Onder, "Temperature effect on calcium aluminate cement based composite binders," The Graduate School of Natural and Applied Sciences of Middle East Technical University, Doctoral Thesis, Jul. 2006.

Kong, Hyun-Joon et al., "Constitutive rheological control to develop a self-consolidating engineered cementitious composite reinforced with hydrophilic poly(vinyl alcohol) fibers", Cement & Concrete Composites, 25 (3), pp. 333-341, (Apr. 2003).

Abonnote, Nathalie et al., "Additive construction: State-of-the-art, challenges and opportunities," Automation in Construction. 72, pp. 347-366; (Published online: Sep. 21, 2016) DOI: 10.1016/j.autcon. 2016.08.026.

Le, T.T et al., "Mix and design and fresh properties for high-performance printing concrete." Materials and Structures, 45 (2012), pp. 121-1232; DOI: 10.1617/s11527-012-9828-z.

Li, Victor C, "Bendable concrete, with a design inspired by seashells, can make US infrastructure safer and more durable," The Conversation (Published online: May 25, 2018) [online] [Retrieved from the internet: Jul. 27, 2020] URL: <https://theconversation.com/bendable-concrete-with-a-design-inspired-by-seashells-can-make-us-infrastructure-safer-and-more-durable-93621>.

Li, Victor C., "On Engineered Cementitious Composites (ECC): A Review of the Material and Its Applications", Journal of Advanced Concrete Technology, vol. 1, No. 3, pp. 215-230 (Nov. 2003).

Li, Zhen et al., "Multifunctional cementitious composites modified with nano titanium dioxide: A review," Composites Part A, 111 (2018), pp. 115-137; (Published online: May 21, 2018) DOI: 10.1016/j.compositesa.2018.05.019.

Lim, S. et al., "Developments in Construction-Scale Additive Manufacturing Processes," Automation in Construction., 21 (2012) pp. 262-268; (Published online Jul. 2, 2011) DOI: 10.1016/j.autcon. 2011.06.010.

Metsa-Kortelainen, Sini et al., "Biomimetic building of 3D printed tailored structures," VTT Technical research Centre of Finland, Research Report VTT-R-00669-14 Mimecomp commissioned by Tekes (public), Mar. 2014.

Quanji, Zhuojun, "Thixotropic behavior of cement-based materials: effect of clay and cement types", Iowa State University, Graduate Theses and Dissertations, Paper 11724, 2010.

Salem, Th.M. "Electrical conductivity and rheological properties of ordinary Portland cement-silica fume and calcium hydroxide-silica fume pastes," Cement and Concrete Research, 32(9), Sep. 2002, pp. 1473-1481; (Published online: May 14, 2002) DOI: 10.1016/S0008-8846(02)00809-8.

Tay, Yi Wei Daniel et al., "3D printing trends in building and construction industry: a review," Virtual and Phys. Prototyp., (2017); (Published online: May 14, 2017) DOI: 10.1080/17452759.2017. 1326724.

Tobaldi, D.M. et al., "Funcitonalised exposed building materials: Self-cleaning, photocatalytic and biofouling abilities," Ceramics International 43 (2017), pp. 10316-10325; (Published online: May 10, 2017) DOI: 10.1016/j.ceramint.2017.05.061.

Warszawski, A. et al., "Implementation of Robotics is Building: Current Status and Future Prospects", J. Constr. Eng. Manage., 1998, 124 (1), pp. 31-41.

Wu, Peng et al., "A critical review of the use of 3-D printing in the construction industry", Automation in Construction, 68 (2016), pp. 21-31; (Published online: Apr. 27, 2016) DOI: 10.1016/j.autcon. 2016.04.005.

Yang, En-Hua et al., "Self-cleaning engineered cementitious composites," Cement and Concrete Composites (2015), vol. 64, pp. 74-83; (Published online: Oct. 8, 2015) DOI: 10.1016/j.cemconcomp. 2015.09.007.

Zhang, Qian et al., "Development of durable spray-applied fire-resistive Engineered Cementitious Composites (Sfr-ECC)," Cement & Concrete Composites, 60 (2015), pp. 10-16; (Published online: Apr. 10, 2015) DOI: 10.1016/j.cemconcomp.2015.03.012.

Kosmatka, Steven H. et al.; "Design and Control of Concrete Mixture"; 14th Edition; Jun. 30, 2005; 4 pages.

Liu Xu; "Study on the Influence of Fiber Mixing on the Performance of Dry Mixed Mortar"; China Concrete and Cement Products; Mar. 20, 2012; pp. 45-48.

Chinese Office Action regarding Chinese Patent Application No. 201880078236.3, dated Jan. 14, 2022; 32 pages.

* cited by examiner

US 11,981,603 B2

SELF-REINFORCED CEMENTITIOUS COMPOSITE COMPOSITIONS FOR BUILDING-SCALE THREE DIMENSIONAL (3D) PRINTING

CROSS-REFERENCE TO RELATED APPLICATIONS

This application is the U.S. National Phase Application under 35 U.S.C. 371 of International Application No. PCT/US2018/058480 filed on Oct. 31, 2018, which claims the benefit of U.S. Provisional Application No. 62/579,567 filed on Oct. 31, 2017. The entire disclosures of the above applications are incorporated herein by reference.

FIELD

The present disclosure relates to cementitious composite compositions suitable for additive manufacturing/3D printing processes that can form self-reinforced cementitious composite structures to be used for building-scale structures.

BACKGROUND

This section provides background information related to the present disclosure which is not necessarily prior art.

Additive manufacturing is a process by which material is applied in an additive, layer-by-layer formation technique. Additive manufacturing can form structures having highly complex geometries and freeform shapes. Three dimensional printing or 3D printing is a widely recognized and applied method of additive manufacturing in the construction industry. Recently, concrete has been a frequent building material of choice for 3D printing in the construction industry, such as printing of buildings and other structures, because it is the most widely used and versatile building material in the world. Uncured concrete mix can be applied by extrusion through a nozzle of a printhead to form a filament of material that can cure to form concrete. The filament can be applied over various substrates or other previously deposited filaments to build a three dimensional structure. Though the construction sector has generally lagged behind other manufacturing/labor-intensive industries in utilizing automated additive manufacturing technologies, recently additive manufacturing has been used to form small scale models of buildings, homes, and office buildings.

While certain types of concrete have been suitable for use in such experimental 3D printing processes, the inherent weaknesses of concrete have been ignored for large scale and practical construction of such structures for long term durability and longevity. Concrete infrastructure suffers from chronic premature degradation due to concrete's low tensile strength and brittle nature. Printed concrete's weaknesses are compounded by the fact that the printing process can introduce additional flaws caused by the layered structure. Just as typical concrete relies on steel reinforcement to handle tensile stresses, for practical long-term applications, steel reinforcement materials must be included or inserted, usually manually, into printed concrete structures. However, printing around a framework of reinforcement material or later inserting reinforcement materials after printing is antithetical to the bottom-up, freeform, automated paradigm that 3D printing should otherwise allow. Further, steel reinforcement within concrete structures is also the cause of a significant amount of concrete degradation, because of corrosion products that introduce additional tensile forces.

Thus, it would be desirable to develop a printable cementitious composition that is tailored to the additive manufacturing process, but also capable of self-reinforcement that will not require inclusion of steel or other metal reinforcement in printed concrete structures.

SUMMARY

This section provides a general summary of the disclosure, and is not a comprehensive disclosure of its full scope or all of its features.

In various aspects, the present disclosure provides a printable cementitious composition for additive manufacturing. The composition has a fresh state and a hardened state. In one variation, in the fresh state, the composition is flowable and extrudable in the additive manufacturing process. In the hardened state, the composition may exhibit a uniaxial tensile strength of greater than or equal to about 2.5 MPa, a tensile strain capacity of greater than or equal to about 1%, and a compressive strength at 100 hours of greater than or equal to about 20 MPa.

In one aspect, the uniaxial tensile strength is greater than or equal to about 2.5 MPa to less than or equal to about 15 MPa.

In one aspect, the uniaxial tensile strength is greater than or equal to about 2.5 MPa to less than or equal to about 7 MPa.

In one aspect, the tensile strain capacity is greater than or equal to about 1% to less than or equal to about 6%.

In one aspect, the tensile strain capacity is greater than or equal to about 2.5% to less than or equal to about 4.5%.

In one aspect, the compressive strength at 100 hours is greater than or equal to about 20 MPa to less than or equal to about 50 MPa.

In one aspect, the hardened state has a compressive strength at 28 days of greater than or equal to about 25 MPa.

In one aspect, the compressive strength at 28 days is greater than or equal to about 25 MPa to less than or equal to about 160 MPa.

In one aspect, after being formed, the cementitious composition remains in the fresh state for greater than 30 seconds to less than or equal to about 90 minutes.

In one aspect, after being formed, the cementitious composition remains in the fresh state for greater than 5 minutes to less than or equal to about 50 minutes.

In one aspect, the fresh state has a flowability factor of greater than or equal to about 1.1 to less than or equal to about 1.7.

In one aspect, the fresh state has a flowability factor of greater than or equal to about 1.1 to less than or equal to about 1.45.

In another aspect, a cementitious structure formed of the printable cementitious composition has a plurality of layers, wherein the structure is substantially free of any metal reinforcement components.

In a further aspect, the plurality of layers comprises a first layer and a second layer in contact with the first layer, wherein an interlayer bonding strength between the first layer and the second layer is greater than or equal to about 1 MPa to less than or equal to about 7 MPa.

The present disclosure further provides a printable cementitious composition for additive manufacturing having a fresh state and a hardened state. In the fresh state, the composition is flowable and extrudable in the additive manufacturing process. In the hardened state, the composition exhibits strain hardening. The printable cementitious composition comprises Portland cement, a calcium aluminate cement, a fine aggregate, water, a high range water reducing agent (HRWRA), and a polymeric fiber.

In one aspect, the hardened state has a uniaxial tensile strength of greater than or equal to about 2.5 MPa, a tensile strain capacity of greater than or equal to about 1%, and a compressive strength at 100 hours of greater than or equal to about 20 MPa.

In one aspect, the Portland cement is present at greater than or equal to about 25 mass % to less than or equal to about 40 mass % of the total mass of the composition, calcium aluminate cement is present at greater than or equal to about 1 mass % to less than or equal to about 4 mass % of the total mass of the composition, the fine aggregate is present at greater than or equal to about 18 mass % to less than or equal to about 35 mass % of the total mass of the composition, water is present at greater than or equal to about 18 mass % to less than or equal to about 30 mass % of the total mass of the composition, the high range water reducing agent (HRWRA) is present at greater than or equal to about 0.2 mass % to less than or equal to about 0.6 mass % of the total mass of the composition, and the polymeric fiber is present at greater than or equal to about 0.7 mass % to less than or equal to about 2.1 mass % of the total mass of the composition.

In one aspect, the fine aggregate comprises sand having an average particle size of less than or equal to about 2 mm.

In one aspect, the polymer fiber comprises polyvinyl alcohol (PVA).

In one aspect, the polymer fiber has a length of greater than or equal to about 5 mm to less than or equal to about 20 mm.

In one aspect, the printable cementitious composition further comprises fly ash, silica flour, microsilica, attapulgite nanoclay, hydroxypropylmethyl cellulose (HPMC).

In a further aspect, the Portland cement is present at greater than or equal to about 25 mass % to less than or equal to about 40 mass % of the total mass of the composition, calcium aluminate cement is present at greater than or equal to about 1 mass % to less than or equal to about 4 mass % of the total mass of the composition, the fine aggregate is present at greater than or equal to about 18 mass % to less than or equal to about 38 mass % of the total mass of the composition, water is present at greater than or equal to about 18 mass % to less than or equal to about 35 mass % of the total mass of the composition, the high range water reducing agent (HRWRA) is present at greater than or equal to about 0.2 mass % to less than or equal to about 0.6 mass % of the total mass of the composition, the polymeric fiber is present at greater than or equal to about 0.7 mass % to less than or equal to about 2.2 mass % of the total mass of the composition, the fly ash is present at greater than or equal to about 5 mass % to less than or equal to about 15 mass % of the total mass of the composition, the silica flour is present at greater than or equal to about 0.1 mass % to less than or equal to about 5.0 mass % of the total mass of the composition, the microsilica is present at greater than or equal to about 2.0 mass % to less than or equal to about 8.0 mass % of the total mass of the composition, the attapulgite nanoclay is present at greater than or equal to about 0.1 mass % to less than or equal to about 5.0 mass % of the total mass of the composition, the hydroxypropylmethyl cellulose (HPMC) is present at greater than or equal to about 0.05 mass % to less than or equal to about 0.5 mass % of the total mass of the composition.

The present disclosure also provides a method of additive manufacturing. The method optionally comprises depositing a cementitious composition in a fresh state by passing the cementitious composition through an aperture to deposit the cementitious composition onto a target. In the fresh state, the composition is flowable and extrudable and after the depositing, the cementitious composition forms a hardened state. The hardened state may exhibit a uniaxial tensile strength of greater than or equal to about 2.5 MPa, a tensile strain capacity of greater than or equal to about 1%, and a compressive strength at 100 hours of greater than or equal to about 20 MPa.

In one aspect, the target is a substrate or the target is the cementitious composition in a hardened state that was previously deposited via the additive manufacturing process.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a chart showing idealized flowability behavior for a cementitious printable material that is graphically represented in terms of flowability evolution, wherein the material is extrudable prior to deposition, extrudable and buildable at the time of deposition, and rapidly hardening after deposition so as to become increasingly buildable. The loss of flowability prior to deposition could theoretically take place at any rate, as long as deposition occurs when the material is both extrudable and buildable.

Figure 20A:
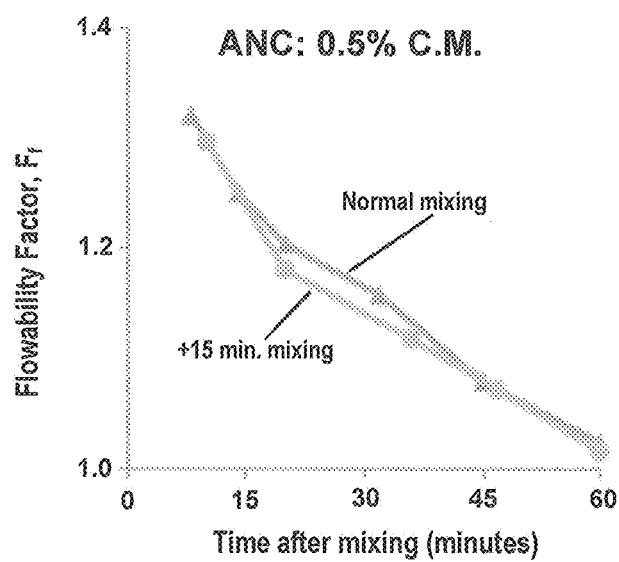
Figure 20B:
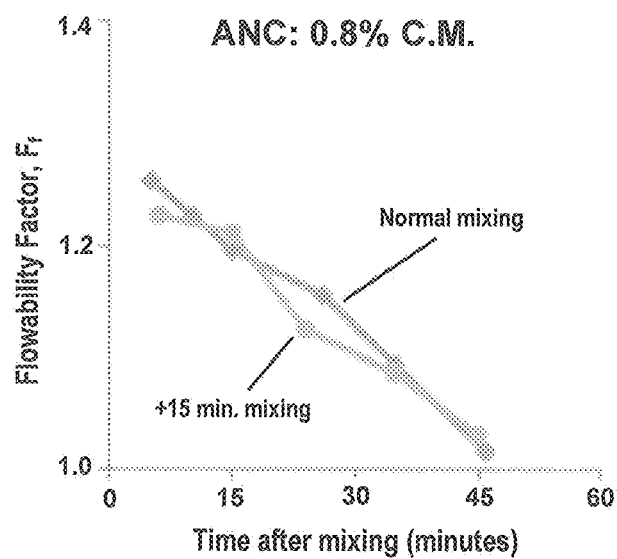

FIGS. 20A-20B show charts of flowability factor versus time after mixing for compositions with calcium aluminate cement (CA) content of 5.0% C., 37° C. water, and attapulgite nanoclay (ANC) content of (a) 0.5% C.M. and (b) 0.8% C.M., show minimal workability loss under an additional 15 minutes of shear agitation (mixing); minimal workability loss under these conditions indicate a highly consistent printable material.

Figure 21:
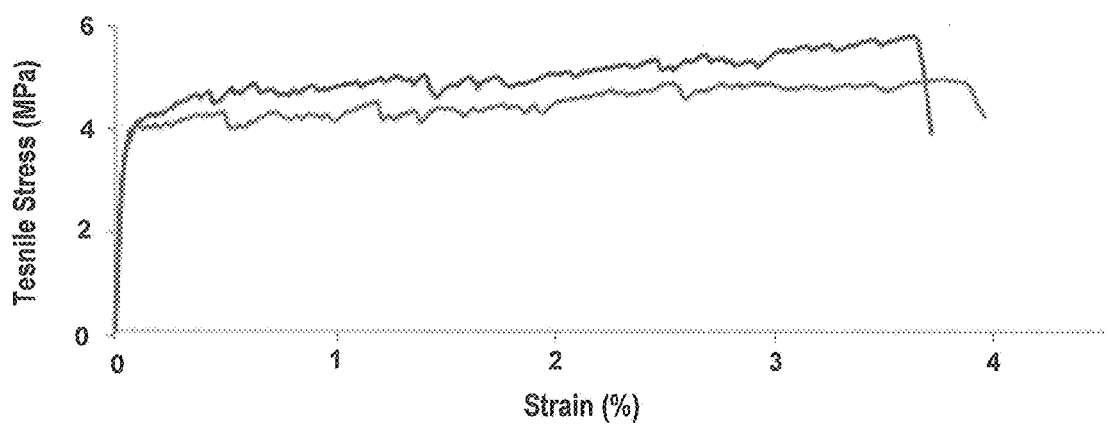
Figure 22A:
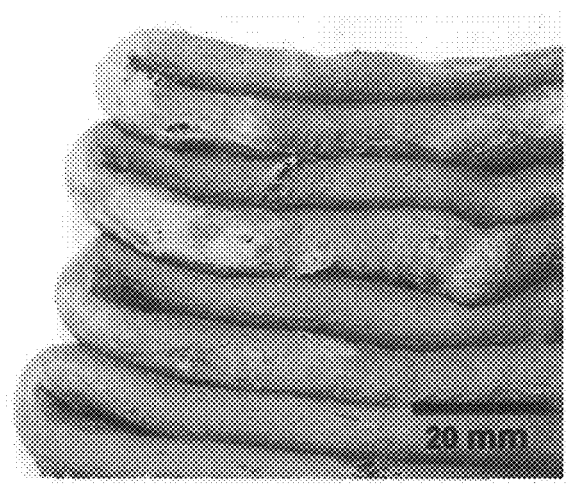
Figure 22B:
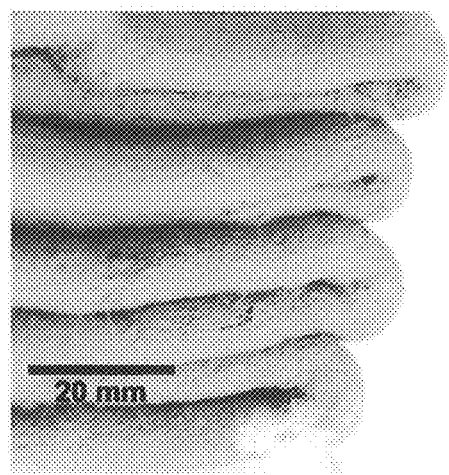
Figure 22C:
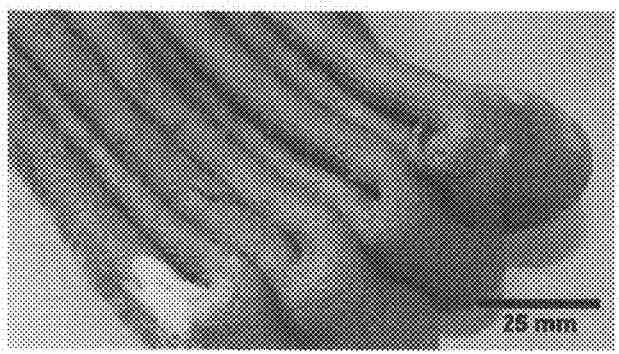
Figure 22D:

FIG. 21 shows representative stress-strain curves illustrating the tensile performance of the Mix 5 composition, showing robust strain-hardening behavior.

FIGS. 22A-22D show photographs of large-scale printing approximations produced with the Mix 5 composition, showing a combination of extrudability, buildability and appropriate hardening/early strength behavior Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges. Unless otherwise indicated, amounts and percentages are provided on a mass basis.

Example embodiments will now be described more fully with reference to the accompanying drawings.

A family of cementitious materials is provided that can be used for the large-scale 3D printing/additive manufacturing of elements or structures. Unlike current 3D printable concrete materials, the materials disclosed herein are capable of self-reinforcement and can form concrete structures that do not require steel reinforcement, as the cementitious materials exhibit tensile strain hardening behavior, as opposed to brittle behavior typical of concrete. In various aspects, a printable cementitious composition for additive manufacturing (e.g., 3D printing) is provided. The cementitious composition has a fresh state and a hardened state. In the fresh state, the cementitious composition is flowable and extrudable during the additive manufacturing process, so that it may be processed, pumped, and extruded at an aperture of a nozzle during printing. However, in the hardened state, the composition desirably exhibits strain hardening behavior. In the hardened state, the cementitious composition further exhibits buildability and rapid hardening, as will be discussed in more detail herein.

The material behaviors that define printability, or the capacity for a material to be successfully processed via the 3D printing process, have been previously described for cementitious materials, see for example, Lim et al., "Developments in Construction-Scale Additive Manufacturing Processes," Autom. in Constr., Volume 21, Pages 262-268 (January 2012), the relevant portions of which are herein incorporated by reference. These attributes include extrudability, buildability, and interlayer bonding, by way of non-limiting example. Extrudability is the capacity of the cementitious material in the fresh (uncured) state to pass or be pumped through small pipes and apertures in nozzles and ultimately be deposited in an even, continuous filament. Buildability is the ability of a printed filament of cementitious material to hold its shape, particularly under the weight of subsequently printed layers over the initial layer of cementitious material. Interlayer bonding is the ability of adjacent deposited cementitious material filaments to form a cohesive bond, producing a unified, structurally sound printed part. Each of these parameters is dependent on "workability," which describes the rheological properties of a freshly mixed cementitious material. Workability can also be expressed as "flowability," an often-used metric to indirectly, but quantitatively, evaluate the rheology of freshly mixed cementitious materials. "Open time" or a "workability window" is defined as the period of time in which the flowability/workability is consistent within certain tolerance acceptable for 3D printing. In certain aspects, the workability window may be measured from the time the components of the cementitious composition are mixed together and formed, in the uncured fresh state, until the cementitious composition can no longer be processed via additive manufacturing and transitions into the hardened state.

With respect to flowability/workability, extrudability and buildability are competing factors in that high workability promotes extrudability, while low workability promotes buildability. Additionally, low workability can negatively affect interlayer bonding. Therefore, these three attributes—extrudability, buildability, and interlayer bonding—require proper balancing in a system to allow printability.

Figure 1:
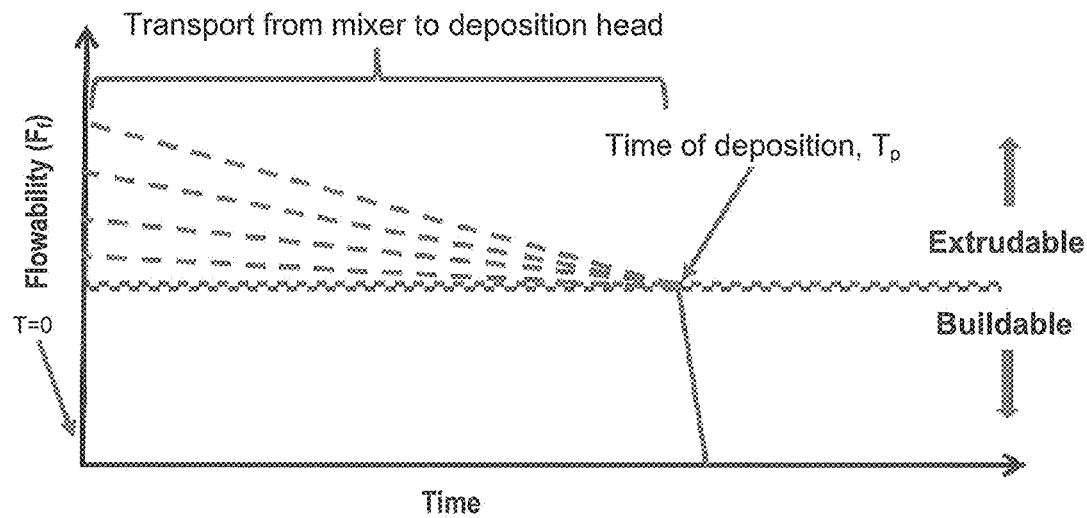

The ideal behavior of a printable cementitious material as described above can be summarized in terms of flowability over time, or "flowability evolution," shown in FIG. 1. Between the time the material is thoroughly and completely mixed, t=0, and the time the material is printed, t=$T_p$, the material is "extrudable" which corresponds to a large range of flowability values above a predetermined value. At the time the material is deposited by the printer head (t=$T_p$), the material is both extrudable and immediately buildable, corresponding to another range of flowability values below the predetermined value. The material needs to first hold its shape when extruded in a predictable way, and by the time subsequent layers are deposited upon it, be able to support those respective weights being deposited thereon without excessive deformation. As such, a desirable cementitious material composition is flowable prior to deposition, both extrudable and buildable at the time of deposition via additive manufacturing, and then rapidly hardens after deposition.

Because the time from mixing of respective constituent components to time of deposition (due to the batch processing typically used for cementitious material) would not realistically be constant for a large-scale print, the time at which the material rapidly hardens is ideally decoupled from the time the material is mixed, or more precisely, the time from which the cementitious material is hydrated. A graphical representation of this theoretical behavior subject to the constraints of construction and cementitious material processing is presented in FIG. 2.

Figure 2:
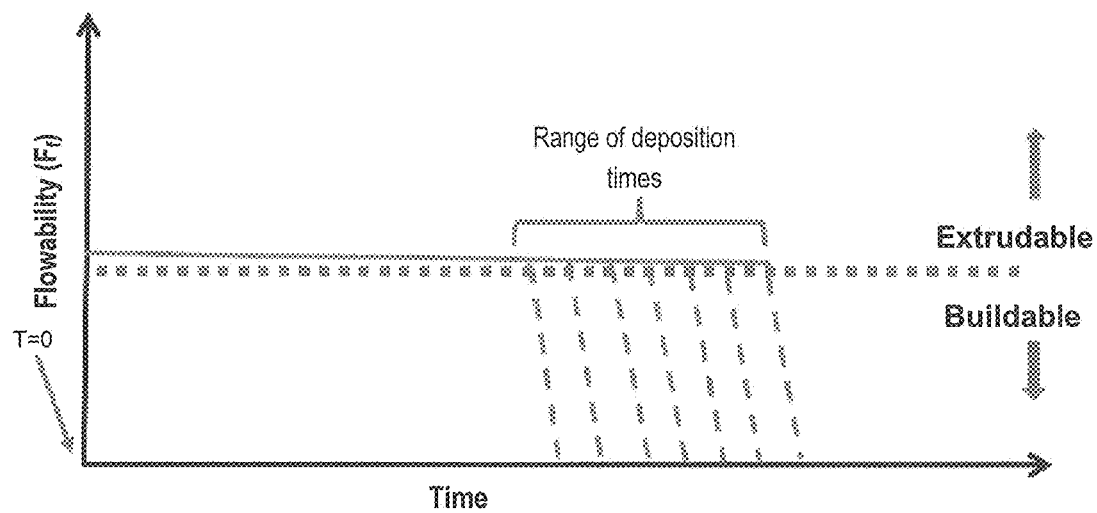
FIG. 2 is a chart showing theoretical flowability evolution compatible with 3D printing, given common practical constraints of construction and cementitious material processing; however, this behavior requires a "harden-on-command" behavior that is atypical and challenging for normal concrete compositions.

As FIG. 2 indicates, there should be minimal workability loss (corresponding to change in flowability, $\Delta F_f$) between the start of deposition to end of deposition. In practice, minimal workability loss during deposition can be extrapolated to also require a low decrease in flowability between the end of mixing of constituent components to the end of deposition. This "harden on command" flowability evolution is atypical and challenging for typical cementitious materials.

Thixotropic rheological behavior can theoretically be exploited to generate this flowability evolution behavior in which hardening is decoupled, at least temporarily, from time after mixing. Thixotropic materials can be described as having a reduced viscosity (i.e., increased flowability) when a shear stress, such as stirring, is applied, compared to the unperturbed state. Viscosity is regained in a thixotropic material when the applied shear stress is removed, in a process called rebuilding. In a 3D concrete printing/additive manufacturing system, shear stresses are applied during the pumping process. Additional agitation can be performed as needed in the material feeding system to ensure that the cementitious material remains flowable during processing and delivery to the printhead of the 3D printing system. In accordance with certain aspects of the present disclosure, a cementitious material that is thixotropic with rapid rebuilding, as illustrated graphically in FIG. 3, is provided that is highly printable.

Figure 3:
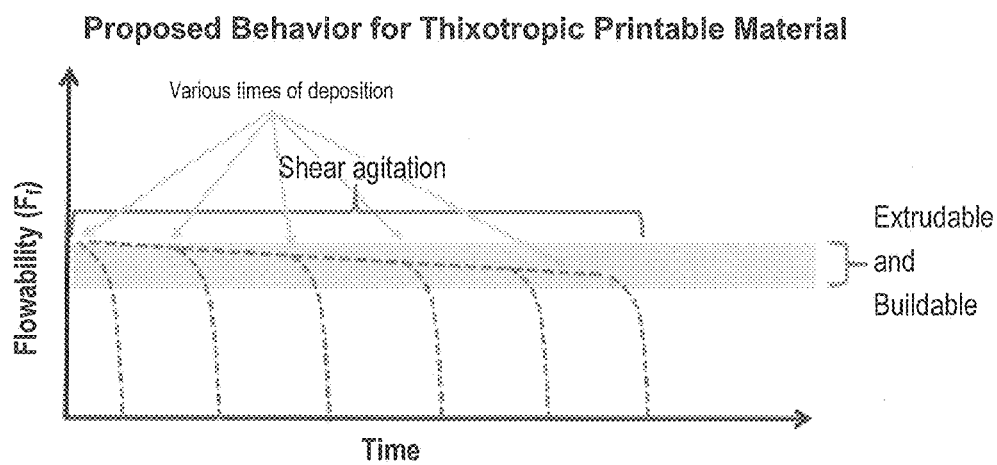
FIG. 3 is a chart showing proposed flowability evolution for a realistically printable cementitious material derived via thixotropy and rapid rebuilding.

A range of flowability values in which the material is both extrudable and buildable, as indicated in FIG. 3, is advantageous. Thixotropy allows a range of flowabilities in which the material is concurrently extrudable, e.g., when a shear stress is applied, and buildable when that shear stress is removed (after the printing is completed).

The present disclosure contemplates cementitious compositions capable of providing such thixotropic behavior, in addition to meeting relevant processing parameters for 3D printing or the attributes associated with printability of cementitious composites. Thixotropic behavior with minimal workability loss and rapid rebuilding is desirable, in combination with mechanical behaviors that promote durability in cementitious materials.

In certain aspects, the cementitious compositions may be considered to be an engineered cementitious composite (ECC). The broad ECC family of cementitious materials is compatible with typical concrete processing methods (e.g., pouring into molds or forms/formwork, spraying, and the like) and can exhibit strain-hardening behavior by way of inclusion a low volume fraction amount of distributed polymer fibers. As noted above, traditional concrete is brittle and weak in tension, prone to failure in many common loading situations such as those that introduce bending moments or shear forces. For this reason, steel or other metal reinforcement is typically used to carry tension within concrete, and printed concrete is no exception. However, steel reinforcement has many drawbacks, including that it is susceptible to corrosion, which introduces additional tensile forces on the concrete cover and often leads to rapid deterioration of concrete structures. Fiberglass and other composite materials have been used previously as extra reinforcement in printed concrete members and structures, mitigating the corrosion issue, however, the placement of extra steel reinforcement into a 3D printed structure contrasts with the speed, ease, and design freedom allowed by the freeform, bottom-up 3D printing paradigm. The need for placement of additional reinforcement in large 3D printed structures has limited the benefits, short of its potential, that the process has been able offer the industry.

In the context of the present disclosure, new printable engineered cementitious composite compositions have been developed for the purpose of improving the durability and resiliency of critical structural and infrastructural components to the extent that reinforcement metal components are not required, while being compatible with additive manufacturing processes. The micromechanics of ECCs have been previously described, and differ from those of other fiber-reinforced concretes. In short, when brittle cementitious matrix fractures are in tension, the dispersed fibers are able to bridge the crack, holding the crack to several tens of microns in width, while carrying the tensile load such that further opening of the microcrack requires more energy than originating a microcrack elsewhere in the matrix. This cycle can be repeated many times, such that the composite is able to distribute deformation throughout and suppress brittle fracture failure. ECCs are more damage and flaw tolerant than other fiber-reinforced materials due to strain-hardening behavior being generated, rather than strain-softening behavior. In fact, ECCs exhibit tensile ductility (strain capacity prior to failure, where failure is defined as the inability to carry and increasing load) and toughness (energy required to cause failure) hundreds of times those values of traditional concretes, providing the potential to eliminate or diminish the amount of steel reinforcement necessary to accommodate tensile loading.

As noted above, engineered cementitious composite materials have been previously developed for the casting application method typical of concretes, as well as the spraying method typical of "shotcretes." While fiber reinforcement in printable cementitious materials has been studied in the past, the fibers in these cases are generally included to mitigate the effects of drying shrinkage and spalling, but do not promote robust tensile strain hardening behavior within the composite, which is responsible for the load-carrying capacity and durability of ECCs, in the printable material. Instead, traditional concrete materials having polymer fibers exhibit tensile strain-softening behavior, which fails to adequately increase material toughness and durability.

In accordance with certain aspects of the present teachings, printable engineered cementitious composite compositions are provided that exhibit the characteristic strain-hardening behavior of ECCs, but are further designed to have the distinct rheological properties required for functional compatibility with construction-industry scale 3D printing processes (e.g., printability). This technology can thus reduce or eliminate the need for steel reinforcement in large-scale printed structures by incorporating such distributed or dispersed short polymer fibers which are able to generate tensile strain hardening behavior, much like that of metal alloys.

In various aspects, the cementitious compositions provided herein allow strain-hardening and distributed microcracking behavior in cementitious materials, much like previously developed and disclosed ECC materials. However, previously developed ECC materials did not exhibit both the fresh state and hardening behavior to make them suitable for additive manufacturing processes. In accordance with certain aspects of the present disclosure, the fresh state rheology of ECC-type materials is modified to make them suitable for printing (for example, by modifying compositional ingredients, ratios, and processing parameters). As discussed above, printability requires that the material concurrently be extrudable (able to be pumped through small apertures/piping), buildable (able to hold its shape once deposited and also support the weight of subsequently deposited layers without excess deformation), and to promote interlayer bonding (to create a unified printed part with structural integrity despite being composed of layers deposited at different time intervals). This modification of composition and processing, promoting fresh state and hardening behavior compatible with additive manufacturing processes, is achieved in accordance with certain aspects of the present disclosure while maintaining the mechanical properties characteristic of ECC materials in the cured material.

The present disclosure thus provides a printable cementitious composition for additive manufacturing. The composition has a fresh state and a hardened state. In the fresh state, the composition is uncured and remains flowable and extrudable in the additive manufacturing process. As noted above, physical agitation may be used to ensure the thixotropic rheology of the composition remains favorable for processing and delivery of the cementitious composition to the print zone. During the additive manufacturing process, for example, just after printing or depositing in the print zone, the printable cementitious composition is buildable. Further, after printing, the cementitious composition then transitions to a hardened state. It should be noted that the process of transitioning from the fresh state to the hardened state may be somewhat progressive or gradual as it is reliant on progress of curing and drying of the composition. However, in the hardened state, the cementitious composition is no longer flowable or printable and can at least in part support weight of a subsequently deposited cementitious composition. As 3D printing does not permit long periods of time between deposition of layers, the cementitious composition desirably transitions to the hardened state after deposition at from greater than or equal to about 1 minute to less than or equal to about an hour; optionally greater than or equal to about 2 minutes to less than or equal to about 50 minutes, and in certain aspects, optionally greater than or equal to about 3 minutes to less than or equal to about 45 minutes. As will be appreciated by those of skill in the art, in the hardened state, the cementitious material will continue to cure and set so that properties will continue to change/increase over time. In certain variations, the hardened state of the cementitious composition reflects the desired strain hardening properties. In the hardened state, the composition may exhibit a desirably high uniaxial tensile strength, a desirably high tensile strain capacity, and high early compressive strength, for example, at 100 hours.

In one aspect, the cementitious composition in the hardened state has a quasi-static (low strain rate) uniaxial tensile strength of greater than or equal to about 2.5 MPa. Such a test may be conducted by preparing tensile specimens via casting using dogbone and coupon conformations, as well as via a manual printing approximation technique in the coupon shape. Both casting and the manual printing approximation techniques of 3D printing may be used to produce cubic specimens for compression testing. All test specimens can be cured in air at room temperature. Mechanical testing on the composites is performed 28 days after being mixed and formed. Tensile testing is performed with a universal tensile testing machine (Instron), with constant displacement loading at a rate of 0.005 mm/s, based on the recommendations of the Japan Society of Civil Engineers, "Recommendations for Design and Construction of High Performance Fiber Reinforced Cement Composites with Multiple Fine Cracks (HPFRCC)," Concrete Engineering Series 82 (March 2008), the relevant portions of which are incorporated herein by reference. Ultimate tensile strength is reported as the stress at the maximum load sustained by each composite. In one aspect, the uniaxial tensile strength is greater than or equal to about 2.5 MPa to less than or equal to about 15 MPa and optionally greater than or equal to about 2.5 MPa to less than or equal to about 7 MPa.

In another aspect, the cementitious composition in the hardened state has a tensile strain capacity of greater than or equal to about 1% as measured by a uniaxial tensile conducted in a test described above in the context of the uniaxial tensile strength. Strain capacity is reported as the strain at maximum stress carried by the composite prior to terminal stress decay. In certain aspects, the tensile strain capacity is greater than or equal to about 1% to less than or equal to about 6%, and optionally greater than or equal to about 2.5% to less than or equal to about 4.5%.

In certain aspects, in the hardened state, the cementitious composition of the present disclosure exhibits a compressive strength at 100 hours of greater than or equal to about 20 MPa. The hardened state sample is aged for 100 hours and then subjected to compression testing performed with a Forney™ compression machine. A loading rate of approximately 50 psi/s is used, based on recommendations of the ASTM C109 International standard. Compressive strength is reported as the stress at the maximum load sustained by the composite. In certain variations, the compressive strength at 100 hours is greater than or equal to about 20 MPa to less than or equal to about 50 MPa.

In yet other aspects, the cementitious composition in the hardened state has a compressive strength measured at 28 days of greater than or equal to about 25 MPa. Thus, the sample is aged for 28 days and subjected to a compression test as described above in the context of the 100 hour compressive strength test. In certain variations, the compressive strength at 28 days is greater than or equal to about 25 MPa to less than or equal to about 160 MPa, optionally greater than or equal to about 30 MPa to less than or equal to about 50 MPa and optionally greater than or equal to about 35 MPa to less than or equal to about 40 MPa. In one variation, the 28 day compressive strength is about 38 MPa.

In certain other aspects, the cementitious composition in the hardened state has a flexural strength or modulus of rupture of greater than or equal to about 5 MPa to less than or equal to about 20 MPa.

In certain variations, the cementitious composition after being formed by combining its various ingredients (including water), remains in the fresh state (referring to the time after mixing in which printing or additive manufacturing may occur) for long enough for 3D printing to be completed. The cementitious composition may therefore may have a fresh state with an open time/workability window prior to hardening and in the absence of shear forces (e.g., absence of mechanical agitation) of greater than or equal to about 30 seconds to less than or equal to about 90 minutes, optionally from greater than or equal to about 5 minutes to less than or equal to about 50 minutes. As will be appreciated by those of skill in the art, agitation or pumping to impart shear forces can prolong the working window of the fresh state beyond the timeframes described above due to the thixotropic rheological properties of the cementitious composition.

In certain aspects, the printable cementitious composition in the fresh state is flowable and therefore has a flowability factor of greater than or equal to about 1.1 to less than or equal to about 1.7. As noted above, the fresh state is the condition of the complete mixed composite composition (including dispersed fibers) during the short time period after complete mixing has been concluded, and in which printing can theoretically take place. Here, workability is quantitatively assessed using the flowability factor, measured via the drop table test (ASTM C1437 and ASTM C230), as used previously for investigations of thixotropic and printable cementitious materials. The flowability factor of cementitious pastes (completely mixed compositions, including fibers) is measured over time (after mixing is stopped) to generate a "flowability evolution" curve, providing a convenient method of describing the change in workability (stiffening) over time intervals relevant to 3D printing. The simplicity of this method of assessing workability over time allows it to be used both to accelerate the design process of new printable mixes and as an on-site quality control technique. In certain variations, the fresh state of the cementitious composition has a flowability factor of greater than or equal to about 1.1 to less than or equal to about 1.45.

A high-performance printing concrete has been developed for an innovative digitally-controlled additive manufacturing method that can build architectural and structural components without molds or formwork, unlike conventional concrete construction methods. The properties of such a cementitious composition in a fresh state include workability/flowability, including extrudability and buildability, which have mutual relationships with the workability and the open time of the concrete mix.

As discussed above, printable cementitious composition for additive manufacturing is contemplated by certain aspects of the present disclosure where in the fresh state, the composition is flowable and extrudable for the additive manufacturing process. In the hardened state, the composition exhibits strain hardening. In certain variations, the composition comprises Portland cement, a calcium aluminate cement, a fine aggregate, water, a high range water reducing agent (HRWRA), and a polymeric fiber.

A Portland cement typically comprises inorganic compounds, such as dicalcium silicate ($C_2S$ or $2CaO \cdot SiO_2$), tricalcium silicate ($C_3S$ or $3CaO \cdot SiO_2$), tricalcium aluminate ($C_3A$ or $3CaO \cdot Al_2O_3$), and tetracalcium aluminoferrite ($C_4AF$ or $4CaO \cdot Al_2O_3 \cdot Fe_2O_3$), which may be hydrated. Commercially available Portland cement often includes additives, such as gypsum (calcium sulfate) that serves as a set retardant, and pozzolans, like fly ash and ground granulated blast furnace slags (GGBFS), that can react with calcium hydroxide and water to form calcium silicate hydrates or calcium aluminate hydrates. When pozzolans are added to Portland cement, they are considered to be blended cements. ASTM, International Test C 150 called the "Standard Specification for Portland Cement" provides eight types of ordinary Portland cement for different applications, namely: Types I, IA, II, IIA, III, IIIA, IV, and V. In certain non-limiting aspects, the Portland cement used in the cementitious composition is Type I. The Portland cement may be present in the cementitious composition at greater than or equal to about 50 mass/weight % to less than or equal to about 98 mass % of the total mass of cementitious binder components, optionally at greater than or equal to about 60 mass/weight % to less than or equal to about 90 mass % of the total mass of cementitious binder components, and in certain variations, optionally at about 72% by mass of the total mass of the cementitious binder components. In other aspects, the Portland cement may be present in the cementitious composition at greater than or equal to about 15 mass % to less than or equal to about 55 mass % of the total composition, optionally at greater than or equal to about 25 mass % to less than or equal to about 45 mass % of the total mass of the total, overall material composition. In certain variations, the Portland cement is present at greater than or equal to about 32 mass % to less than or equal to about 36% by mass. In one embodiment, Portland cement is present in the composition at about 35 mass % of the total, overall composition. The cementitious composition also includes a calcium aluminate cement. A calcium aluminate cement typically comprises inorganic compounds, such as calcium aluminate (CA or $CaO \cdot Al_2O_3$), dicalcium aluminate ($C_2A$ or $2CaO \cdot Al_2O_3$), and tricalcium aluminate ($C_3A$ or $3CaO \cdot Al_2O_3$). Calcium aluminate cement (CA) manipulates the rate of hardening, for example, increasing the rate of hardening of the cementitious composition. An example of a suitable calcium aluminate cement is REFCON® commercially available from Calucem, which has high early strength, refractoriness, high abrasion resistance, and resistance to sulfuric acid corrosion. The calcium aluminate cement may be present in the cementitious composition at greater than 0 mass/weight % to less than or equal to about 15 mass % of the total mass of cementitious binder components, optionally at greater than or equal to about 3 mass/weight % to less than or equal to about 10 mass % of the total mass of cementitious binder components, and in certain variations, optionally at about 5 mass % of the total mass of cementitious binder components. In other aspects, the calcium aluminate cement may be present in the cementitious composition at greater than or equal to about 0.5 mass % to less than or equal to about 6 mass % of the total composition, optionally greater than or equal to about 1 mass % to less than or equal to about 4 mass % of the total composition. In one variation, the calcium aluminate cement is present in the cementitious composition at about 2.4 mass % of the total composition.

The cementitious composition also includes a fine aggregate, such as an inert sand or inert finely crushed stone. Fine aggregates have a particle size distribution having approximately 95% passing on a 9.5 mm sieve (⅜ inch sieve). In certain variations, the fine aggregate is sand. The solid aggregate is distributed within the cementitious matrix to form a composite. In certain variations, the aggregate may be substantially homogeneously distributed within the cementitious composite (e.g., concrete) that is formed. The fine aggregate may comprise sand that has an average particle size of less than or equal to about 2 mm. In one non-limiting variation, the aggregate may be an F-75 silica or quartz sand commercially available from U.S. Silica. The fine aggregate may be present in the cementitious composition at greater than or equal to about 20 mass/weight % to less than or equal to about 65 mass % of the total mass of cementitious binder components, optionally at greater than or equal to about 30 mass/weight % to less than or equal to about 60 mass % of the total mass of cementitious binder components, and in certain variations, optionally at about 45 mass % of the total mass of cementitious binder components. In other aspects, the fine aggregate, such as sand, may be present in the cementitious composition at greater than or equal to about 10 mass % to less than or equal to about 40 mass % of the total composition, optionally greater than or equal to about 10 mass % to less than or equal to about 30 mass % of the total composition.

The cementitious composition also includes a high range water reducing agent (HRWRA), also known as a plasticizer/superplasticizer. Inclusion of the HRWRA can serve to reduce water content needed in the cementitious composition by about 10% to about 30%. The HRWRA can create high fluidity with good flowability properties for the cementitious composition, contributing to making the cementitious composition suitable for additive manufacturing by helping to eliminate the need for any vibration or compaction after deposition. An example of a suitable HRWRA is a low viscosity polycarboxlate based high-range water-reducing admixture commercially available from W.R. Grace as ADVA® 190. The HRWRA may be present in the cementitious composition at greater than or equal to about 0.3 mass/weight % to less than or equal to about 1.5 mass % of the total mass of cementitious binder components, optionally at greater than or equal to about 0.4 mass % to less than or equal to about 1.3 mass % of the total mass of cementitious binder components, optionally in certain variations, at about 0.8 mass % of the total mass of cementitious binder components. In other aspects, the HRWRA may be present in the cementitious composition at greater than or equal to about 0.1 mass % to less than or equal to about 0.8 mass % of the total composition. In one variation, the total cementitious composition has about 0.4 mass % HRWRA.

In other aspects, the cementitious composition comprises at least one type of polymeric fiber distributed within the cementitious matrix to form a composite (in combination with the aggregate solid material). In certain variations, the plurality of polymer fibers may be substantially homogeneously distributed within the cementitious composite (e.g., concrete) that is formed. In certain aspects, the plurality of polymer fibers may be substantially aligned in a predetermined direction as the cementitious composition is deposited via additive manufacturing. The polymer fibers may have a single composition or may include a mixture of different compositions or other combinations of select properties, such as different lengths or diameters. The polymer fibers may include a variety of distinct polymers; however, in certain variations, the fibers may comprise polyvinyl alcohol (PVA) or polyalkylene fibers, such as polyethylene (PE) or polypropylene (PP), including high tenacity polypropylene (HTPP) fibers. In other aspects, the polymer fibers may be natural polymer fibers, such as sisal, jute, curaua fibers, and/or cellulose-based fibers. In certain variations, the polymeric fibers may be oil coated. The oil coating may be greater than or equal to about 1 to less than or equal to about 1.5% by mass, for example, about 1.2% by mass, of the total mass/weight of the fiber and oil coating combined.

An aspect ratio of the polymer fiber can be a factor in generating a cementitious composition having the desired behavior of printability and tensile ductility. While maximizing length of the fiber is advantageous for increasing mechanical strength of the cementitious composite formed, including too long of a fiber in the cementitious composition can impact processability during 3D printing, for example, cause balling or agglomeration that can clog/block the 3D printing system. The polymer fiber may have an aspect ratio (AR) or ratio between a length of the fiber (L) and a diameter (D) of the fiber (AR=L/D) of greater than or equal to about 150. In certain variations, the AR may be greater than or equal to about 150 to less than or equal to about 900. For PVA fibers, an exemplary AR may be about 300, while for polypropylene fibers, an exemplary AR may be about 800.

In certain variations, a polymer fiber used in the cementitious composition has a length of greater than or equal to about 4 mm to less than or equal to about 20 mm, optionally greater than or equal to about 6 mm to less than or equal to about 15 mm, optionally greater than or equal to about 8 mm to less than or equal to about 12 mm, and in certain variations, optionally greater than or equal to about 8 mm to less than or equal to about 10 mm. In certain variations, a polymer fiber used in the cementitious composition has a diameter of greater than or equal to about 10 micrometers (μm) to less than or equal to about 200 μm. In one variation, the polymeric fiber is a PVA fiber that may have a length of about 12 mm and a diameter of about 40 micrometers. In another variation, the polymeric fiber is a PP fiber that may have a length of about 12 mm and a diameter of about 12 micrometers. The polymer fiber may be present in the cementitious composition at greater than or equal to about 1 vol. % less than or equal to about 4.5 vol. % of the total volume of the cementitious composition, optionally at greater than or equal to about 1.8 vol. % to less than or equal to about 4 vol. %, and in certain variations, optionally at about 2 vol. %. In certain compositions, 2 vol. % is about 2.9 mass/weight %.

Water is also included in the cementitious composition. A mass ratio of water to cementitious binder components (e.g., Portland cement, calcium aluminate, and any other pozzolanic materials, like fly ash) may be greater than or equal to about 0.2 to less than or equal to about 0.55. In one variation, a mass ratio of water to cementitious binder components is about 0.43. Water temperature can be used to intentionally manipulate the fresh state properties of a particular cementitious material composition. Water temperature affects fresh state rheological properties due to the accelerated activation of pozzolanic reactions of the cementitious materials. Water may be present in the cementitious composition at greater than or equal to about 10 mass % to less than or equal to about 35 mass % of the total cementitious composition. In one variation, the water may be present at about 20 to about 21% by mass of the total composition (e.g., about 20.7%).

In certain variations, the cementitious composition further comprises one or more components selected from the group consisting of: fly ash, microsilica, silica flour, attapulgite nanoclay, a cellulose-based additive, and combinations thereof.

As noted above, fly ash can be added to the cementitious composition and serves as a pozzolan/cementitious material. Fly ash is an industrial byproduct, for example, collected from effluent of a coal burning boiler unit. It can be used as a substitute for a portion of the Portland cement to reduce energy consumption required to form the overall product and increase the environmental friendliness of the cementitious composition, while contributing to the cementitious properties of the matrix/binder system of the concrete composite. In one variation, the fly ash may be a Class F fly ash as designated by ASTM C618, which is formed from combustion of anthracite and/or bituminous coals. ASTM C618 requires that Class F fly ash contain at least 70% pozzolanic compounds (silica oxide, alumina oxide, and iron oxide). The fly ash may be present in the cementitious composition at 0 mass/weight % to less than or equal to about 45 mass % of the total mass of cementitious binder components, optionally at 0 mass % to less than or equal to about 35 mass % of the total mass of cementitious binder components, an in certain aspects, optionally at about 23 mass % of the total mass of cementitious binder components. In other aspects, the fly ash may be present in the cementitious composition at 0 mass % to less than or equal to about 25 mass % of the total cementitious composition. In one variation, the fly ash is present at about 11 mass % of the total composition.

Microsilica (MS) can be substituted for silica sand by weight. Microsilica generally has an average particle size of greater than or equal to about 50 nm to less than or equal to about 200 μm. In one variation, an average particle size of the microsilica is greater than or equal to about 50 nm to less than or equal to about 200 nm, for example, a mean particle size may be about 150 nm (less than 0.1% of primary particles have a particle size of greater than 450 nm). Microsilica increases a rate of hardening (see for example, FIG. 6); however, a significant increase in water content is required to produce proper dispersion of fiber in the cementitious composition, and effects of the increase in water dominate at the higher water contents. Though the higher water contents produce acceptable early flowability, they also produce longer time to hardening. A suitable microsilica is Elkem Microsilica® 955, which is commercially available from Elkem. When present, the microsilica may be present in the cementitious composition at 0 mass % to less than or equal to about 30 mass % of the total mass of cementitious binder components, optionally at 0 mass % to less than or equal to about 20 mass % of the total mass of cementitious binder components, an in certain aspects, optionally at about 10 mass % of the total mass of cementitious binder components. In other aspects, the microsilica may be present in the cementitious composition at 0 mass % to less than or equal to about 15 mass % of the total cementitious composition. In one variation, the microsilica may be present at greater than or equal to about 4 mass % to less than or equal to about 5 mass % of the total composition, for example, at about 4.8 mass %.

Figure 6:
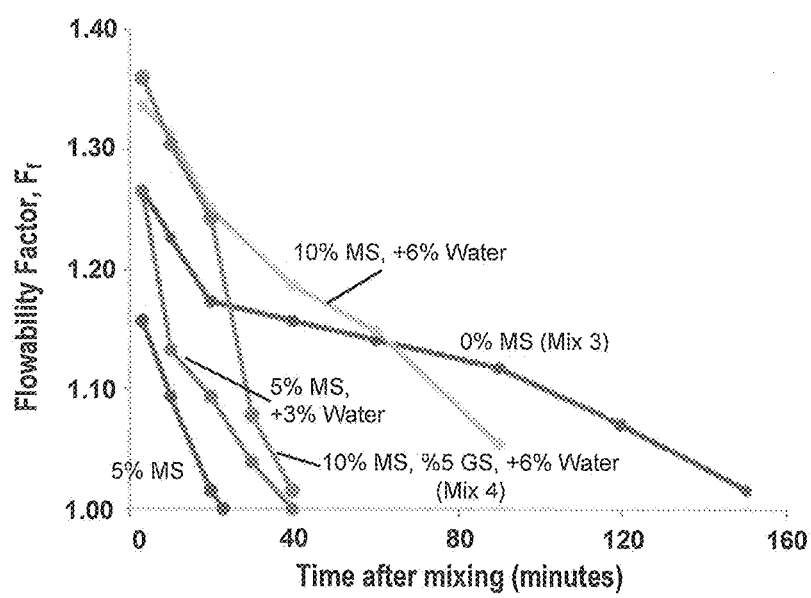
FIG. 6 is a chart showing the effect of microsilica (MS) dosage on flowability evolution in the small batch size. These mix compositions are based on Mix 3 and inspired Mix 4.

Ground silica, also called silica flour, may be added to the cementitious composition and generally has a particle size of greater than or equal to about 40 μm to less than or equal to about 300 As seen in FIG. 6, introducing ground silica (GS), in addition to microsilica (MS) allows both the early flowability and a rapid rate of hardening. This is likely due to a more even particle size distribution caused by the substitution of MS and GS for silica sand—the GS has an average particle size between those values of F-75 silica sand and MS. For example, microsilica has an average particle size of about 150 nm, ground silica has an average particle size of greater than or equal to about 40 to less than or equal to about 70 micrometers, and silica sand has an average particle size of greater than or equal to about 200 to less than or equal to about 300 micrometers. A suitable ground silica/silica flour is U.S. Silica brand Sil-Co-Sil™ 75 (crystalline quartz). The ground silica may be present in the cementitious composition at 0 mass % to less than or equal to about 20 mass % of the total mass of cementitious binder components optionally at 0 mass % to less than or equal to about 10 mass % of the total mass of cementitious binder components, an in certain aspects, optionally at about 5 mass % of the total mass of cementitious binder components. In other aspects, the ground silica may be present in the cementitious composition at 0 mass % to less than or equal to about 10 mass % of the total cementitious composition. In one variation, the ground silica may be present at greater than or equal to about 2 mass % to less than or equal to about 3 mass % of the total composition, for example, at about 2.4 mass %.

In various aspects, the total cumulative amount of aggregate in the cementitious composition, including any fine aggregate like sand, microsilica, and ground silica may be greater than or equal to about 15 mass % to less than or equal to about 60 mass % of the total composition.

In yet other aspects, the cementitious composition includes a cellulose-based additive, such as hydroxypropylmethyl cellulose (HPMC). Generally, the HPMC manipulates viscosity of the inventive cementitious composition in its the fresh state, for example, it can be used as thickening agent to increase viscosity, prevent segregation during pumping, and promote thixotropy. The cellulose-based additive may be present in the cementitious composition at 0 mass % to less than or equal to about 1.5 mass % of the total mass of cementitious binder components optionally at 0 mass % to less than or equal to about 0.8 mass % of the total mass of cementitious binder components, and in certain aspects, optionally at about 0.4 mass % of the total mass of cementitious binder components. In other aspects, the cellulose-based additive may be present in the cementitious composition at greater than or equal to about 0 mass % to less than or equal to about 0.6 mass % of the total cementitious composition. In one variation, the cellulose-based additive may be present at about 0.19 mass % of the total composition mass.

In certain aspects, the cementitious composition includes an attapulgite nanoclay (ANC). The attapulgite nanoclay promotes thixotropy of the cementitious composition in its fresh state during additive manufacturing. The effect on workability evolution of ANC dosages shows a thickening effect, where the flowability (flowability factor, $F_f$) is decreased and time to hardening is prolonged when mixed into large batch sizes. Thus, rate of hardening $$\left(\frac{\Delta F_f}{t}\right)$$

is slightly increased when the attapulgite nanoclay is included. An effect on the mitigation of workability loss is also observed at the 0.5% cementitious material basis (C.M.) and 0.8% C.M. dosages of ANC, as discussed further below. One suitable exfoliated attapulgite nanoclay is an Active Minerals International product called ACTIGEL™208, which is a highly purified hydrous magnesium aluminum-silicate (attapulgite) made from a proprietary process that creates pure, uniformly sized, rod—shaped mineral particles. When present, the ANC may be present in the cementitious composition at 0 mass % to less than or equal to about 3 mass % of the total mass of cementitious binder components optionally at 0 mass % to less than or equal to about 2 mass % of the total mass of cementitious binder components, an in certain aspects, optionally at about 0.5 mass % of the total mass of cementitious binder components. In other aspects, the ANC may be present in the cementitious composition at 0 mass % to less than or equal to about 0.9 mass % of the total cementitious composition. In one variation, the ANC is present at about 0.25 mass % of the total composition mass.

In certain variations, the printable cementitious composition comprises Portland cement at greater than or equal to about 30 to less than or equal to about 40 mass % of the cementitious composition, calcium aluminate cement is present at greater than or equal to about 1 to less than or equal to about 4 mass % of the total cementitious composition, the fine aggregate is present at greater than or equal to about 18 to less than or equal to about 40 mass % of the cementitious composition, water is present at greater than or equal to about 18 to less than or equal to about 30 mass % of the cementitious composition, the high range water reducing agent (HRWRA) is present at greater than or equal to about 0.2 to less than or equal to about 0.6 mass % of the cementitious composition, and the polymeric fiber is present at greater than or equal to about 0.7 to less than or equal to about 2.1 mass % of the total composition by mass. All ranges are given in percentage by weight of the overall weight of the total composition in the unmixed state.

Such printable cementitious compositions may have the properties discussed above, including by way of example, that in the hardened state, the cementitious composition has a uniaxial tensile strength of greater than or equal to about 2.5 MPa, a tensile strain capacity of greater than or equal to about 1%, and a compressive strength at 100 hours of greater than or equal to about 20 MPa.

In other variations, the present disclosure provides printable cementitious compositions having Portland cement is present at greater than or equal to about 25 to less than or equal to about 40 mass % of the total mass of the composition, calcium aluminate cement is present at greater than or equal to about 1.0 to less than or equal to about 3.5 mass % of the composition, the fine aggregate is present at greater than or equal to about 18 to less than or equal to about 38 mass % of the composition, water is present at greater than or equal to about 18 to less than or equal to about 35 mass % of the composition, the high range water reducing agent (HRWRA) is present at greater than or equal to about 0.2 to less than or equal to about 0.6 mass % of the composition, the polymeric fiber is present at greater than or equal to about 0.7 to less than or equal to about 2.2 mass % of the composition, the fly ash is present at greater than or equal to about 5 to less than or equal to about 15 mass % of the composition, the silica flour is present at greater than or equal to about 0.1 to less than or equal to about 5 mass % of the composition, the microsilica is present at greater than or equal to about 2 to less than or equal to about 8 mass % of the composition, the attapulgite nanoclay is present at greater than or equal to about 0.1 to less than or equal to about 0.5 mass % of the composition, the hydroxypropylmethyl cellulose (HPMC) is present at greater than or equal to about 0.05 to less than or equal to about 0.5 mass % of the total composition mass. All ranges are given in percentage by weight of the overall weight of the total composition in the unmixed state.

Table 1 below shows exemplary ranges of various components in printable cementitious compositions contemplated by the present disclosure. Compositional values are given as % C.M. are given as a percentage of total cementitious material, by weight, where cementitious material is defined as cement (all types) and fly ash (e.g., ingredient weight divided by the sum of weights of Type I Portland cement and calcium aluminate cement an fly ash). Fiber content is also measured by volume of total composite material.

TABLE 1

|  | Minimum % C.M., by weight (except as noted below) | Maximum % C.M., by weight (except as noted below) |
| --- | --- | --- |
| Portland cement (e.g., Type I) | 50 | 98 |
| Fly Ash (e.g., Class F) | 0 | 45 |
| CaAl Cement (e.g., REFCON ™) | 0 | 15 |
| Attapulgite Nanoclay (e.g., ACTIGEL ™ 208) | 0 | 3 |
| Silica flour | 0 | 20 |
| Microsilica (e.g., Elkem Microsilica ® 955) | 0 | 30 |
| Sand (any type) | 20 | 65 |
| Water | 25 | 60 |
| Cellulose-Based Additive (e.g., HPMC) | 0 | 1.5 |
| HRWRA (e.g., ADVA-190) | 0.3 | 1.5 |
| Polymer Fiber (e.g., PVA fiber 12 mm length/ 1.2% oil coating) | 1 | 4.5 |

Table 2 below shows ranges of components particularly suitable for printable cementitious compositions contemplated by the present disclosure.

TABLE 2

|  | Minimum % C.M., by weight (except as noted below) | Maximum % C.M., by weight (except as noted below) |
| --- | --- | --- |
| Portland cement (e.g., Type I) | 60 | 90 |
| Fly Ash (e.g., Class F) | 0 | 35 |
| CaAl Cement (e.g., REFCON ™) | 3 | 10 |
| Attapulgite Nanoclay (e.g., ACTIGEL ™ 208) | 0 | 2 |
| Silica flour | 0 | 10 |
| Microsilica (e.g., Elkem Microsilica ® 955) | 0 | 20 |
| Sand (any type) | 30 | 60 |
| Water | 28 | 55 |
| Cellulose-Based Additive (e.g., HPMC) | 0 | 0.8 |
| HRWRA (e.g., ADVA-190) | 0.4 | 1.3 |
| Polymer Fiber (e.g., PVA fiber 12 mm length/ 1.2% oil coating) | 1.8 | 4 |

Table 3 below shows ranges of components of a particularly suitable printable cementitious compositions contemplated by the present disclosure.

TABLE 3

|  | Proportion (relative to Type I Portland Cement content, by weight) | % C.M., by weight (except as noted below) |
| --- | --- | --- |
| Portland cement (e.g., Type I) | 1 | 72 |
| Fly Ash (e.g., Class F) | 0.320 | 23 |
| CaAl Cement (e.g., REFCON ™) | 0.070 | 5 |
| Attapulgite Nanoclay (e.g., ACTIGEL ™ 208) | 0.007 | 0.5 |
| Silica flour | 0.070 | 5 |
| Microsilica (e.g., Elkem Microsilica ® 955) | 0.139 | 10 |
| Sand (any type) | 0.625 | 45 |
| Water | 0.597 | 43 |
| Cellulose-Based Additive (e.g., HPMC) | 0.005 | 0.4 |

TABLE 3-continued

| | Proportion (relative to Type I Portland Cement content, by weight) | % C.M., by weight (except as noted below) |
|---|---|---|
| HRWRA (e.g., ADVA-190) | 0.0118 | 0.8 |
| Polymer Fiber (e.g., PVA fiber 12 mm length/1.2% oil coating-2% Vol., 2.9 Wt. %) | 0.040 | 2.9 |

In various aspects, a printable cementitious composition can be printed through an aperture of a nozzle of a 3D printing head. The aperture may have a diameter of greater than or equal to about 10 mm to less than or equal to about 110 mm. For example, this mix can printed through a 9 mm diameter aperture in a nozzle forming consistent filaments during deposition to build up to 61 layers in one session without noticeable deformation of bottom layers. The workability window/open time extended up to 100 minutes. The compressive strength of concrete exceeded the target set, being 110 MPa at 28 days.

The present disclosure also contemplates methods of additive manufacturing, which may include depositing a cementitious composition in a fresh state by passing the cementitious composition through an aperture, for example, an aperture of a nozzle of a 3D printhead, to deposit the cementitious composition onto a target. In the fresh state, the composition is flowable and extrudable and after the depositing. The cementitious composition may be deposited in a flowing continuous stream that formed a deposited ribbon or filament of the material. The cementitious composition forms a hardened state exhibiting a uniaxial tensile strength of greater than or equal to about 2.5 MPa, a tensile strain capacity of greater than or equal to about 1%, and a compressive strength at 100 hours of greater than or equal to about 20 MPa. Any of the cementitious compositions discussed above are contemplated for use in such methods. In certain variations, the target is a substrate or the target is the cementitious composition in a hardened state that was previously deposited via the additive manufacturing process. In this manner, a layer-by-layer deposition process can occur to form a bonded layered structure from the cementitious composition. In certain aspects, the deposited filaments or layers can be aligned normal to the axis of loading.

During the depositing, the plurality of polymer fibers in the cementitious composition may be aligned during the extrusion process through the aperture, so that a material stream or filament that is deposited has a plurality of polymer fibers that are substantially aligned along a predetermined axis. By substantially aligned, it is meant that a major axis of each of the plurality of polymer fibers only varies in orientation from other polymer by 25° or less. The orientation of the fibers may be changed between layers by changing the orientation of the deposition and nozzle to create a layered structure advantageously having layers with polymer fibers in different orientations to further enhance strength of the layered structure.

Bond strength between layers is another important aspect of the printed form of cementitious composites. Interlayer bond strength can be measured by uniaxial tension. In certain variations, the interlayer bond strength is greater than or equal to about 1 MPa to less than or equal to about 7 MPa for the layered structures formed from the cementitious compositions of the present disclosure, optionally greater than or equal to about 1 MPa to less than or equal to about 4 MPa, and optionally greater than or equal to about 1.5 MPa to less than or equal to about 4 MPa.

In certain aspects, a concrete structure (e.g., cementitious composite) is formed from such a printable cementitious composition, wherein the structure is substantially free of any metal reinforcement components. This technology itself has particular application for structures near bodies of water and humid environments, where corrosion of steel reinforcement causes rapid degradation. By omitting the reinforcement metals, the potential for corrosion is substantially reduced. The present disclosure contemplates large-scale 3D printing of concrete structures, like pedestrian bridges, emergency housing/shelters, low-cost housing, customizable structures and architecturally striking structures/forms/members having complex shapes. Such structures formed in seismic zones advantageously provide the ability to accommodate significant shear loading is needed. These cementitious composite materials can minimize or prevent spalling and further can handle tensile stresses. As such, the cementitious composite materials are well-suited to serve as the "shell" components in the often-used shell/fill structural 3D printing approach. The use of 3D printing for habitable structures in many countries depends on local and regional building codes. Initial applications in the United States, for example, will be directed to carports, sheds, architectural elements, art, pedestrian bridges, experimental projects, and the like. However, in many countries, like Dubai and the Netherlands, office buildings, homes, and larger structures may be formed by 3D printing.

The suitability of the proposed definitions of extrudability and buildability and associated test methods, as well as the optimized mix, have been validated by the manufacture of a full-scale freeform component with proportions commensurate with the likely dimensions of potential construction products such as cladding and wall panels.

Various embodiments of the inventive technology can be further understood by the specific examples contained herein. Specific Examples are provided for illustrative purposes of how to make and use the compositions, devices, and methods according to the present teachings and, unless explicitly stated otherwise, are not intended to be a representation that given embodiments of this invention have, or have not, been made or tested.

Example 1

The flowability factor of cementitious pastes (completely mixed compositions, including fibers) is measured over time (after mixing is stopped) to generate a "flowability evolution" curve, providing a convenient method of describing the change in workability (stiffening) over time intervals relevant to 3D printing.

The material compositions tested herein are listed in Table 4, which are included due to their hypothesized effects on the fresh state and early stage properties, which are believed to promote target behaviors for printable cementitious materials. All compositional components are reported in percentage, by weight, of the total cementitious material. Here, "total cementitious material" is defined as (Type I cement+Fly Ash+calcium aluminate cement) by weight. All mixes contain 2% by volume polyvinyl alcohol (PVA) fiber cut to 12 mm. Fiber is included in all the mixes for all tests due to its significant effect on properties in both the fresh and cured states. All compositions are reported in percentage of total cementitious material (% C.M.), apart from fiber content which is reported in volume fraction.

TABLE 4

| Mix No. | Type I Portland Cement | Class F Fly Ash | CaAl* Cement | F-75 Silica Sand | MS** | GS*** | H₂O | ANC† | HPMC†† | HRWRA††† | PVA Fiber 12 mm length (% by vol.) |
|---|---|---|---|---|---|---|---|---|---|---|---|
| 0 | 45.5 | 54.5 | 0 | 36.3 | 0 | 0 | 26.4 | 0 | 0 | 0.3 | 2 |
| 1 | 76.9 | 23.1 | 0 | 61.5 | 0 | 0 | 35.4 | 0 | 0.4 | 0.6 | 2 |
| 2 | 76.9 | 53.1 | 0 | 61.5 | 0 | 0 | 38 | 0 | 0.4 | 0.8 | 2 |
| 3 | 69.6 | 22.4 | 8 | 60 | 0 | 0 | 37.2 | 0 | 0.4 | 0.8 | 2 |
| 4 | 69.6 | 22.4 | 8 | 45 | 10 | 5 | 43 | 0 | 0.4 | 0.8 | 2 |
| 5 | 72 | 23 | 5 | 45 | 10 | 5 | 43 | 0.5 | 0.4 | 0.8 | 2 |

*CaAl Cement: Calcium Aluminate Cement
**Microsilica
***Ground silica
†Attapulgite nanoclay
††Hydroxypropylmethylcellulose
†††High range water reducing agent Mixing of the components of the cementitious compositions is conducted in KitchenAid (6 qt.) or Hobart (12 gal.) planetary-style mixers. Because the mixing process, including the order of ingredient addition and time of addition, affect the fresh properties of the cementitious paste, this procedure is conducted according to an explicit schedule. Dry ingredients (excluding ANC, HPMC, and MS) are mixed first for at least five minutes. A portion of the water content is added at time zero, followed by the high range water reducing agent (HRWRA) at t=30 seconds, and the MS content between t=1:00 min and t=2:00 min.

A remaining portion of the water content is mixed with the ANC and used for the ANC exfoliation process, similar to that described in Kawashima (2013), in a standard 40 oz./700 W blender, The portion of the water content separated out for this process is ~0.7-1.0 L., depending on the batch size, is sufficient to cover the blender blades and for rinsing of the blender jar to ensure nearly all of the exfoliated ANC content is added to the mix. The ANC is exfoliated in water (blended) for at least 3 min. before being added to the mix. The ANC content, and associated water content, is added to the mix at t=6 min. For mixes not including ANC, the entirety of the water content is added at time zero.

Half the HPMC content is added at t=8 min, followed by the addition of fibers in small handfuls between t=9 min and t=12 min, after which the remainder of the HPMC content is added. Mixing continues until t=28 to ensure even dispersion and activation of the viscosity modifying ingredients.

In addition to compositional ingredients, several processing parameters are investigated for their effect on fresh state properties. Water temperature and batch size, two controllable processing parameters, are used as variables. The water content for each mix reported herein, unless otherwise stated, can be assumed to be 20-25° C. at time of addition. Three typical batch sizes are used in this example: 1.2 L, 3.1 L, and 6.2 L, which will hereafter be referred to as small, medium, and large batches.

For the investigation of workability loss, half of the mix volume is removed from the mixer at t=28 min, and drop table flowability testing is performed at regular time intervals. The other half of the mix volume remains in the mixer and continues to be mixed for an additional 15 min and is removed at t=43 min, at which time flowability testing is performed. Comparison of the flowability evolution between these two volumes of the same mix determines the workability loss with continued agitation. Minimal workability loss is targeted for robust printability.

While thixotropy is not directly measured via hysteresis, workability loss is used as an indicator of "single cycle" thixotropy over the short time scale in which a cementitious material would be printed.

A manual extrusion technique is used as a preliminary, small-scale approximation of the final step of typical 3D printing processes designed for concrete. This printing approximation technique uses a mechanically actuated caulk gun, with circular nozzle diameters 8 mm-13 mm. In lieu of a progressive cavity pump, a peristaltic pump with a 3 cm tube diameter and 4 cm×1.5 cm flat tip nozzle is used for a large scale approximation. Manual agitation of the material in the hopper of the peristaltic pump is performed to maintain adequate workability over the period of printing.

Uniaxial tensile and compression testing is used to evaluate mechanical performance of the materials. Tensile specimens are prepared via casting using dogbone and coupon conformations, as well as via the manual printing approximation technique in the coupon shape. Both casting and the manual printing approximation technique are used to produce cubic specimens for compression testing. All test specimens are cured in air at room temperature as would be realistic for printed forms in practice. Mechanical testing on the composites is performed 28 days after being mixed and formed.

Tensile testing is performed with a universal tensile testing machine (Instron), with constant displacement loading at a rate of 0.005 mm/s, based on the recommendations of the JSCE, Ultimate tensile strength is reported herein as the stress at the maximum load sustained by each composite. Strain capacity is reported as the strain at maximum stress carried by the composite prior to terminal stress decay.

Compression testing is performed with a Forney compression machine. A loading rate of ~50 psi/s was used, based on recommendations of the ASTM C109 International standard. Compressive strength is reported as the stress at the maximum load sustained by the composite.

Figure 4:
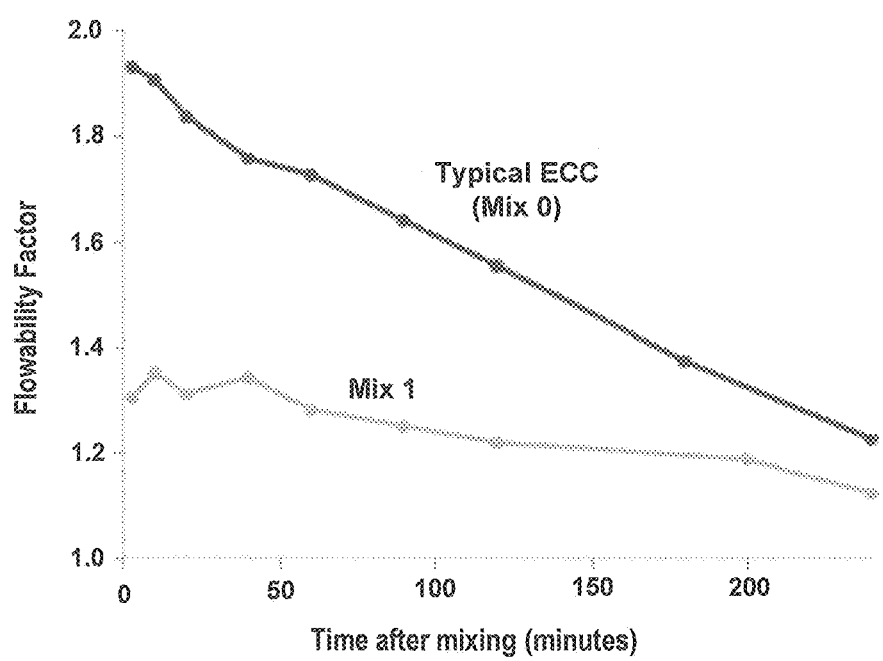
FIG. 4 is a chart showing flowability evolutions for a typical castable ECC (Mix 0) and a viscosity modified version (Mix 1) incorporating HPMC. Neither flowability evolution is appropriate for 3D printing due to the long hardening times.

The flowability evolution of typical ECCs (represented by Mix 0), designed for casting, is not appropriate for 3D printing due to high initial flowability and the long time required for the material to harden, as illustrated in FIG. 4. For comparison, Mix 1 is also plotted in FIG. 4. In Mix 1, HPMC is used as a thickening agent to create a mix that exhibited flowability values that allows extrudability and the ability of the extruded filament to hold its shape. Preliminary testing, using the manual extrusion approximation technique, showed that flowability factor values between 1.4 and 1.2 are an appropriate target for extrudability and shape stability under self-weight, however rapid hardening is also required for buildability. Mix 1 shows that manipulation of viscosity via HPMC and cement/fly ash ratio is successful in modifying the flowability factor to fall within this range. However, a practical printable cementitious material is not achieved due its slow rate of hardening. Rapid hardening (after extrusion) is desired to accommodate the weight of many subsequently deposited layers and to facilitate time-efficient construction.

Figure 5:
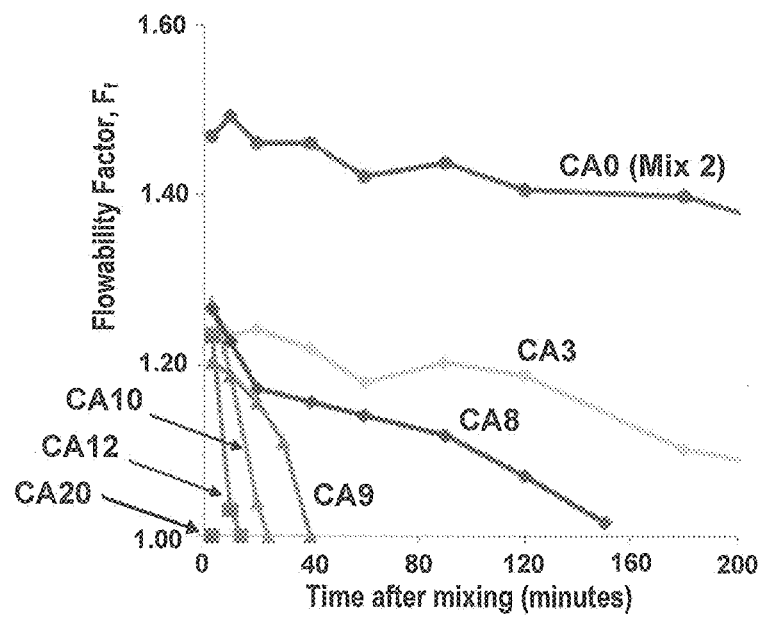
FIG. 5 is a chart showing the effect of calcium aluminate dosage on the flowability evolution of the cementitious composite in the small batch size, where CA0, CA3, and CA8 et cetera, represent calcium aluminate cement content of 0, 3, and 8 et cetera percent by weight of total cementitious material, respectively.

The impact of certain components on workability evolution is further studied herein. Calcium aluminate cement (CA) is seen to be effective in manipulating the rate of hardening. Mix 2 is used a baseline to illustrate the effect of CA dosage on the rate of hardening. Water content was adjusted slightly to allow sufficient mixing and fiber dispersion for several dosages. The effect on flowability evolution of various dosages of CA, in the small batch size, is illustrated in FIG. 5. In FIG. 5, the effect of calcium aluminate dosage on the flowability evolution of the cementitious composite in the small batch sizes is shown, where CA0, CA3, and CA8 et cetera, represent calcium aluminate cement content of 0, 3, and 8 et cetera percent by weight of total cementitious material, respectively. The rapid hardening seen in CA/Portland cement mixes has been previously attributed to the rapid formation of Ettringite and secondarily due to the hydration of CAC. In larger batch sizes, the rapid hardening rates seen in FIG. 5 for CA9+ are achieved with lower CA dosages (5% C.M.), with the addition of ANC and increased water temperature.

Microsilica, substituted for silica sand by weight, is seen to increase the rate of hardening (FIG. 6), however significant increase in water content is required to produce proper dispersion of fiber, and effects of the increase in water dominated at the higher water contents. Though the higher water contents produced acceptable early flowability, they also produced longer time to hardening. As seen in FIG. 6, introducing ground silica (GS), also called silica flour, in addition to MS is seen to allow both the early flowability and a rapid rate of hardening. This is likely due to a more even particle size distribution caused by the substitution of MS and GS for silica sand—the GS has an average particle size between those values of F-75 silica sand and MS. This promising composition incorporating both MS and GS is Mix 4.

Figure 7:
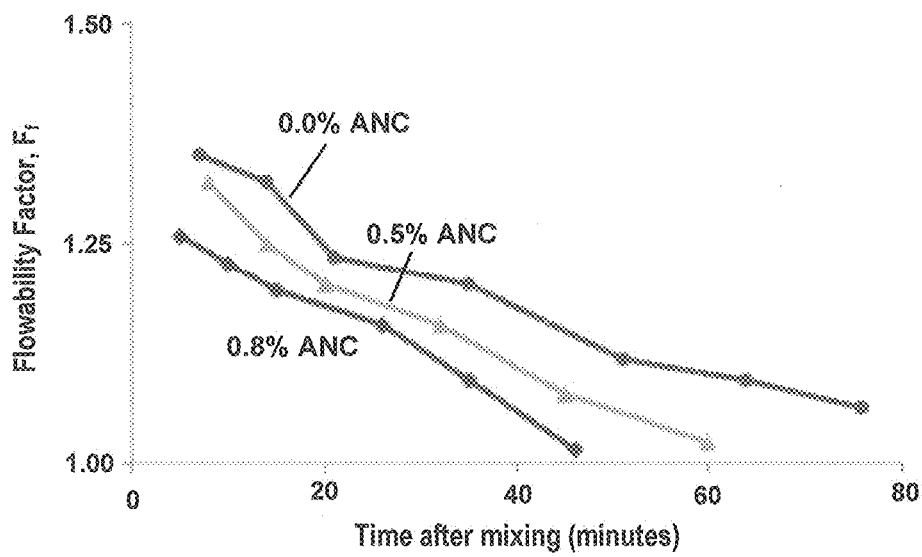
FIG. 7 is a chart of showing the effect of attapulgite nanoclay (ANC) reducing flowability and a time to hardening.

The effect on workability evolution of ANC dosages is illustrated in FIG. 7. A thickening effect, reducing the flowability and time to hardening, is seen when mixed into large batch sizes. Rate of hardening $$\left(\frac{\Delta F_f}{t}\right)$$

is slightly increased when the attapulgite nanoclay is included. An effect on the mitigation of workability loss is also observed at the 0.5% cementitious material basis (C.M.) and 0.8% C.M. dosages of ANC.

Figure 8:
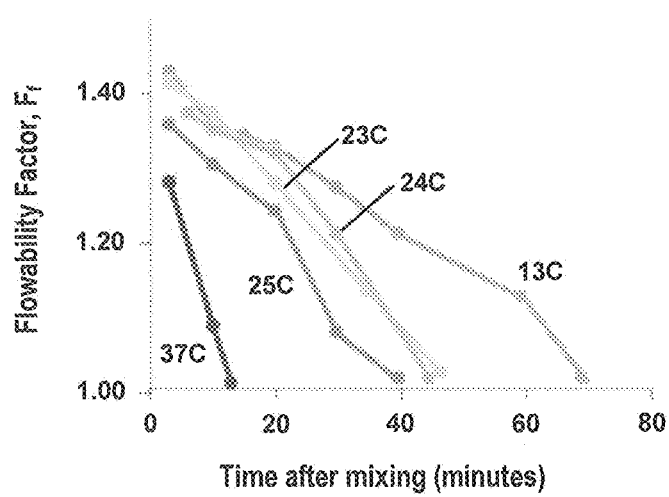
FIG. 8 is a chart showing the effect of water temperature on flowability evolution in Mix 4 (small batch).

The Mix 4 composition is used to illustrate the effect of water temperature on workability in the fresh state, as seen in FIG. 8. The flowability evolution curves for the three clustered, intermediate temperatures illustrate the degree of variability to be expected between different batches of the same composition. Most current concrete printing technology hardware should be able to handle a degree of material variation for practical application, but it is recommended that water temperature be carefully monitored and controlled for mixing of printable cementitious composites. Water temperature can also be used to intentionally manipulate the fresh state properties of a particular mix composition. Water temperature affects fresh state rheological properties due to the accelerated activation of pozzolanic reactions of the cementitious materials.

Figure 9:
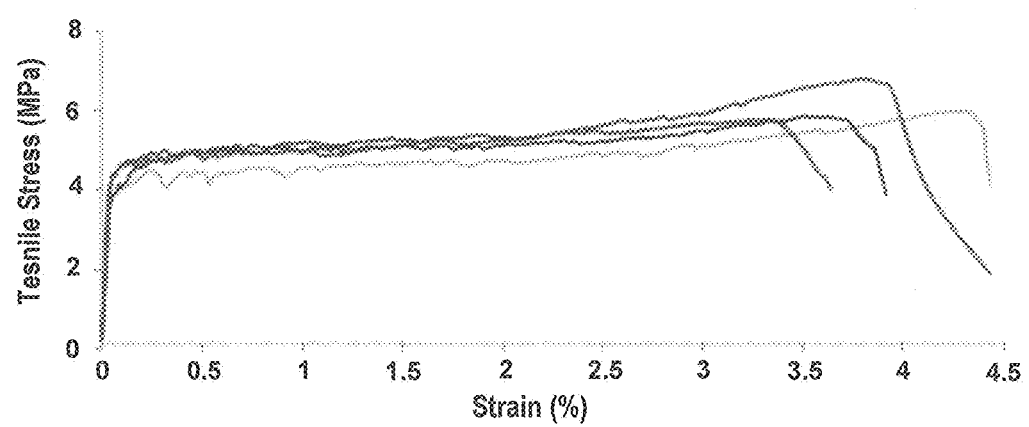
FIG. 9 shows stress-strain curves (blue) of specimens cast with Mix 4, tested under direct tension, compared with a representative curve (gray) for a typical ECC material (Mix 1), using dogbone shaped specimens.

Tensile performance of each composition is evaluated to confirm robust tensile strain hardening behavior. Mix 4 performs similarly to castable ECC compositions when each is tested in the cast form (FIG. 9). Specimens are tested in the cast dogbone form to determine the inherent tensile properties of the material itself. This specimen type generally measures the material's ideal tensile performance due to the shape of the specimen which encourages fiber alignment and mitigation of stress concentrations and flaws.

Figure 10A:
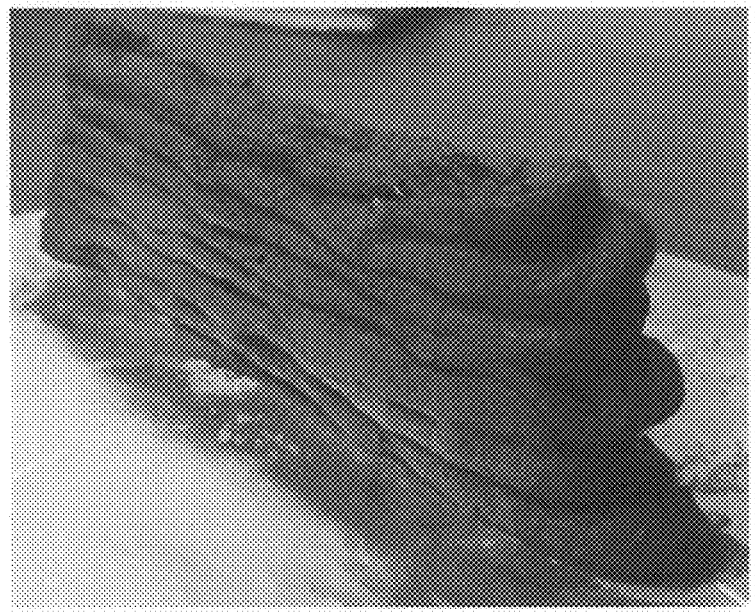
FIGS. 10A-10C are photographs showing 3D printed layered coupon specimens.
Figure 10B:
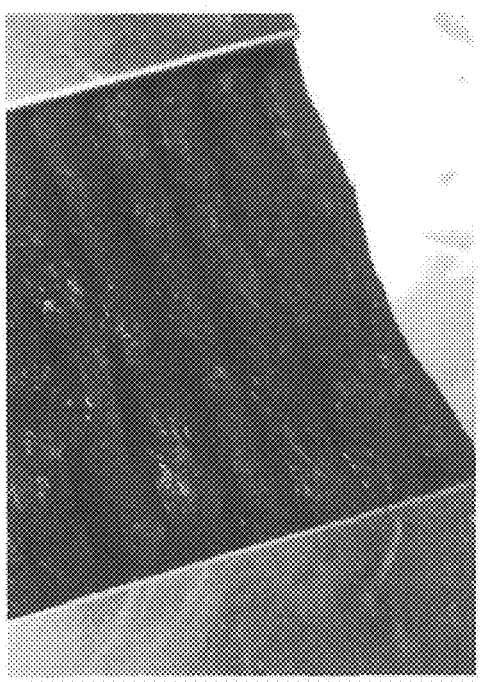
Figure 10C:
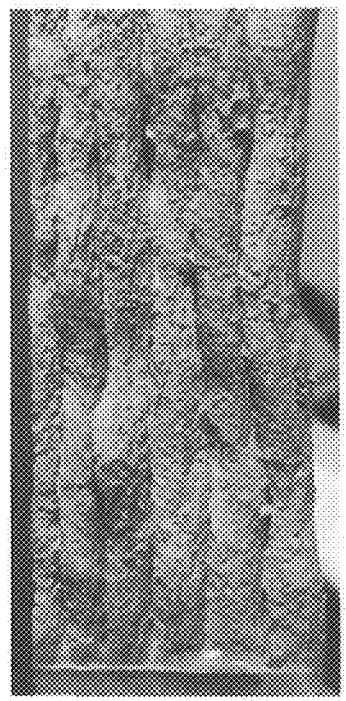

To assess the tensile performance in the printed or "structured" state, specimens are prepared with Mix 4, using the manual extrusion approximation technique described above. This technique allowed specimens to be produced with aligned filaments in multiple layers (see FIGS. 10A-10C), mimicking the structure of a printed form. This form includes imperfections, such as rough, ribbed surfaces, and the joints (and sometimes small gaps) between adjacent filaments. These specimens are "printed" in the rectangular shape of the coupon specimens often used to test cast cementitious materials in tension.

Figure 11:
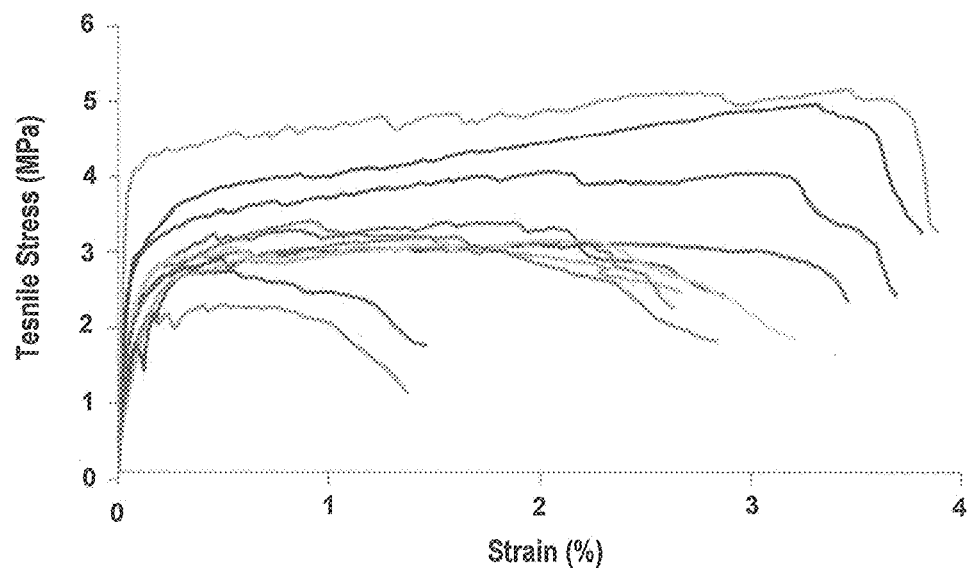
FIG. 11 shows stress-strain curves for the 3D printed specimens (blue curves), with highly aligned fiber orientation, which outperform the cast specimens (red curves) composed of the same material, when compared using the coupon specimen shape.
Figure 12:
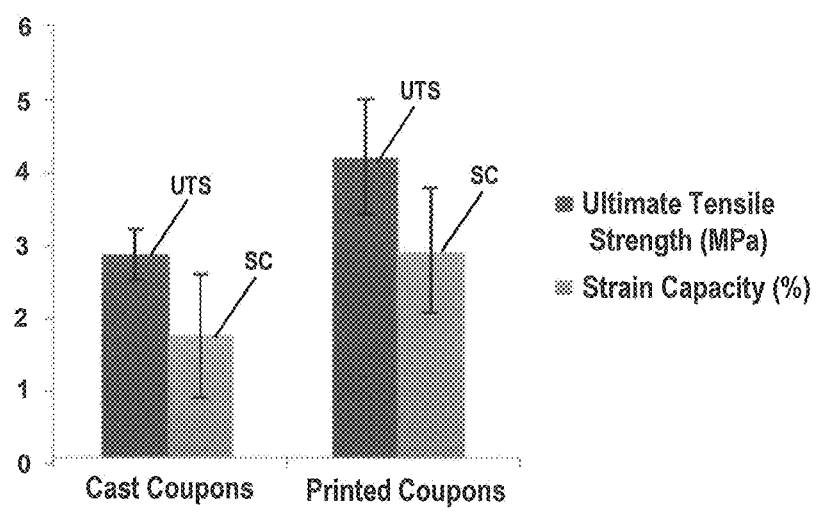
FIG. 12 shows a bar graph of the effect on tensile strength and strain capacity of the printed structuring illustrated with the Mix 4 composition.

As seen in FIG. 11, these "printed" coupon-shaped specimens are compared under direct tension with "cast" specimens (coupon form) of the same composition (Mix 4), to illustrate the effect on mechanical performance of the structuring that would result from the 3D printing process. The average ultimate tensile strength and strain capacity of the printed and cast specimens are compared in FIG. 12. The superior performance in the printed form can be attributed to a much higher degree of fiber alignment in the tensile direction.

The degree of fiber alignment is likely to be reduced as the filament size is increased for process scaling, but alignment is still expected to be generated based on the material flow/extrusion process. Deliberate nozzle design may be used to enhance fiber alignment even as the process is scaled. This control over fiber alignment (parallel to the 3D printing toolpath) provides opportunities to (1) reinforce critical areas of structures vulnerable to failures in tension, (2) impart mesoscale material structuring for functional grading or deformation mode manipulation, and (3) optimize mechanical properties for a given structure or part.

Multiple curves for each type of specimen are included in FIG. 11 to illustrate the range in performance observed for each type of specimen. The variable performance of the printed specimens can likely be attributed to the inhomogeneity of flaw size produced by the printing process and/or pattern. Regarding the difference in mechanical behavior when compared to the tensile performance of the dogbone specimens: the coupon specimen form generally approximates material performance in the bulk state, with minimal fiber alignment, such as how the material would be structured in a large-scale cast form.

Figure 13:
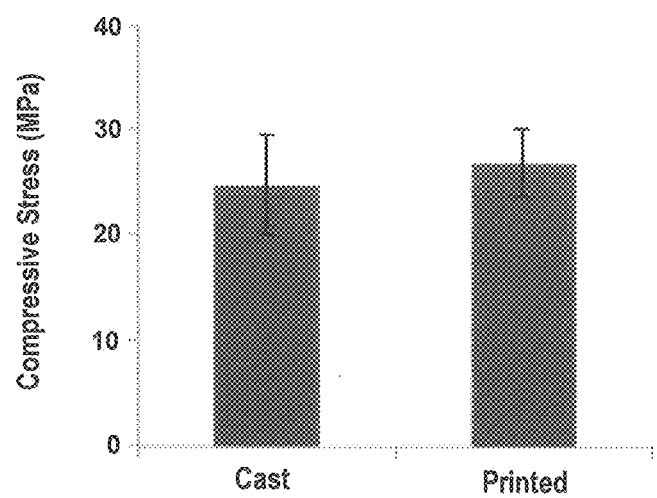
FIG. 13 shows a bar graph where no significant difference is seen in compressive strength between structures produced by the casting and 3D printing processes, using the Mix 4 composition.

The effect on compressive strength of the printing process structure is also tested. Specimens printed in a cubic shape (with minimal intentional internal voids) are compared to specimens cast into the cubic shape. The results are compared in FIG. 13. No significant difference in compressive strength is observed.

Figure 14:
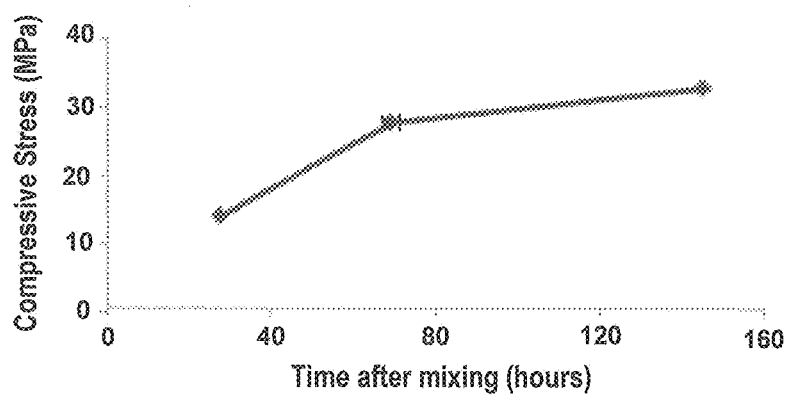
FIG. 14 shows a chart of early strength of the Mix 5 3D printable ECC composition measured over time.

Early strength of a printable composition is important due to the significant amount of weight it is expected to support in the hours after being deposited, as the otherwise unsupported member or structure is constructed. The early strength of the Mix 5 composition, containing ANC, is measured using compressive testing of cast cube specimens to ascertain material properties of the composition (FIG. 14). This Mix 5 composition is shown to meet all other requirements of a printable cementitious composite (extrudability, buildability, rapid hardening, and robust tensile properties). These compressive strength values are not necessarily representative of any particular printed member formed with this composition due to flaws that could arise from the printing process, but rather an accurate representation of the inherent material properties of the composition. These values are similar to those reported for printable concrete by Rushing et al., "Investigation of Concrete Mixtures for Additive Construction, Rapid Prototyp. J., Vol. 23 Issue: 1, pp. 74-80 (2017), the relevant portions of which are hereby incorporated by reference (30-38 MPa at seven days after mixing). It could be realistic to expect, due to the geometry of the printed filaments (high surface area), that strength may be gained even more quickly in a printed form.

Figure 15:
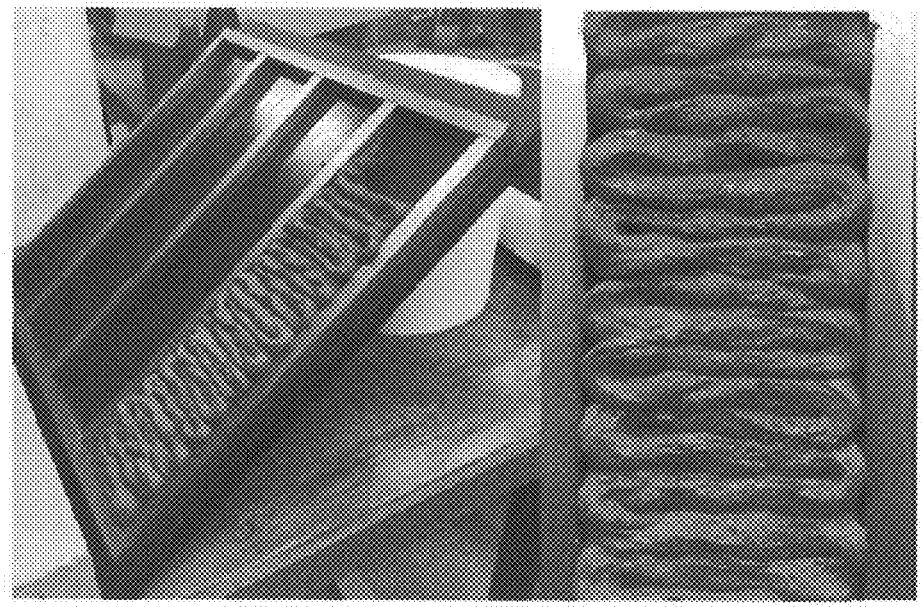
FIG. 15 shows a photograph of preparation of the print pattern to be used in interlayer bonding testing of Mix 4 via the approximated 3D printing technique. Coupon shaped specimens are sectioned from the print pattern and tested in tension with the loading axis normal to the bond lines between filaments.

The interlayer bond strength is another important aspect of the printed form of cementitious composites. To characterize the strength between adjacent printed filaments coupon tensile specimens are sectioned from the printed pattern pictured in FIG. 15. Specimens are printed and cured in the partially supported 45-degree angle arrangement pictured. Filaments are aligned normal to the axis of loading.

Figure 16:
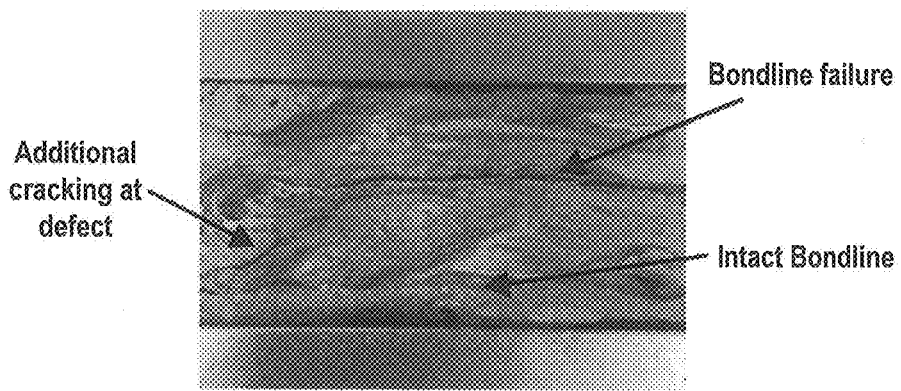
FIG. 16 shows a photograph of an example of a tested interlayer bonding specimen.

Four specimens of the Mix 4 composition are tested. The average interlayer bond strength is measured to be 0.9 MPa with a standard deviation of 0.5 MPa. This is a conservative characterization of the average interlayer bond strength as it represents the weakest of the three bond lines in each tensile specimen. An example of a tested specimen is seen in FIG. 16. All specimens ultimately failed along one of the bond lines within the gage section, though all specimens showed a plurality of cracks, demonstrating a degree of failure suppression.

Figure 17:
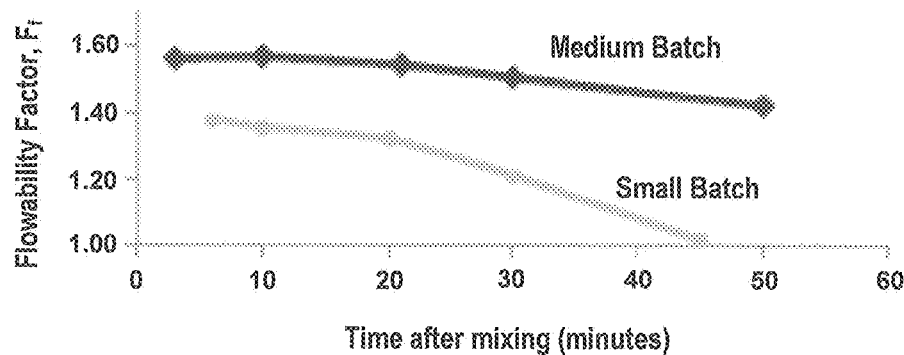
FIG. 17 shows a chart comparing flowability evolution for Mix 4 mixed in small (1.2 L) and medium (3.1 L) batches. The flowability evolution associated with the small batch is considered more appropriate for use with the 3D printing process.

It is seen that batch size has an effect on the fresh state properties of the cementitious compositions reported here. Larger batch sizes generally showed higher flowability and slower rates of hardening than the same composition proportions mixed in the small batch size (1.2 L), as illustrated for Mix 4 in FIG. 17.

Figure 18:
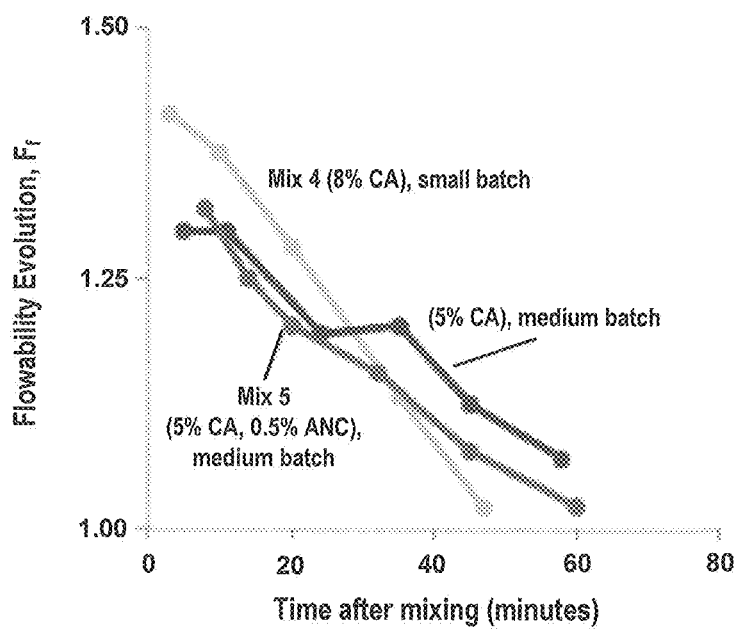
FIG. 18 shows a chart representing flowability of the Mix 4 composition approximated in a larger batch size when the calcium aluminate cement (CA) composition is reduced to 5.0% C.M. and with the addition of 0.5% Attapulgite nanoclay (ANC). Both medium batches included here use 37° C. water, while the small batch uses room temperature water.

A mix composition that mimicked the flowability evolution seen in the small batch version of Mix 4 in the medium batch size is derived by reducing the CA content, adding attapulgite nanoclay, and using a water content with an elevated temperature. The flowability evolution of this recalibrated composition (Mix 5) is compared to that of Mix 4, mixed in a small batch, in FIG. 18. CA content is reduced based on the results discussed herein, ANC is added based on results observed during this example, and the use of elevated water temperature is used based on results from this example. Batch size is a processing parameter that should be accounted for in scaling processing of printable cementitious materials.

Figure 19:
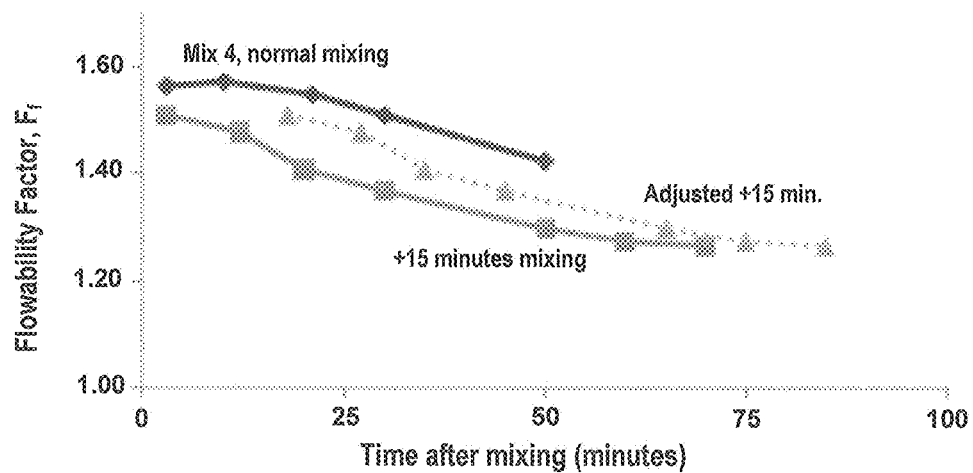
FIG. 19 shows a chart with significant workability loss of Mix 4, indicated by the lower flowability factor values at similar time intervals, under an additional 15 minutes of shear agitation. The discrepancy between the top curve and the dotted curve illustrates the contribution of additional mixing, as opposed to simply time, to workability loss for this particular composition.

Under the workability loss test scheme, Mix 4 exhibited significant workability loss. As seen in FIG. 19, with an additional 15 minutes of applied shear agitation (mixing), the fresh state material showed reduced flowability factor values at every time interval. Even if this (+15 min mixing) flowability curve is shifted 15 minutes on the x-axis (as represented by the dotted curve in FIG. 19) to account for the additional time spent in the mixer, the flowability factors are still less than those values at the same time intervals for the portion of the mix not subjected to additional mixing. This indicates that for this composition, continued shear agitation accelerates hardening and loss of workability, which is not desirable for consistent, controllable printing performance.

Attapulgite nanoclay and reduced CA content are seen to reduce workability loss to near zero, a target behavior for printability. FIGS. 20A-20B show the flowability evolution for compositions with an ANC contents of 0.5% C.M. and 0.8% C.M. (each with a calcium aluminate cement content of 5.0% C.M. and 37° C. water), when mixed for 28 and 43 minutes after the addition of water. The composition with ANC content of 0.5% C.M. is Mix 5, and is detailed in Table 4. For both the 0.5% and 0.8% ANC compositions, the portion of the paste (including fibers) that is mixed for an additional 15 minutes shows matching flowability evolution to those portions only mixed for 28 minutes, indicating near zero workability loss under continued shear agitation.

Near zero workability loss allows the material to exhibit the "harden on command" type behavior described in FIG. 3 as being a target for printability.

Due to the minimal workability loss, appropriate flowability evolution, and robust strain-hardening behavior (FIG. 21) exhibited by the Mix 5 composition, it is used for a large-scale printing approximation (FIGS. 22A-22D).

The Mix 5 composition exhibits great extrudability and immediate buildability as well as sustained printability over a period of time. The material showed clay-like workability with shear thinning behavior and rapid rebuilding that allowed both extrusion and buildability with minimal deformation of layers under the weight of subsequent layers. Several stacks of 6-9 layers, and 30 cm in length, are produced. The filament produced is approximately 1 cm thick (height) and 4 cm wide. The rate of deposition is intentionally slowed to simulate the longer time between deposition passes that would be characteristic of larger print sizes.

The influences of several compositional ingredients on fresh state flowability evolution are explored in this example. Calcium aluminate cement, HPMC, microsilica, ground silica, purified and exfoliated attapulgite nanoclay, and water content are used to manipulate fresh state rheological behavior. HPMC can be used to manipulate initial flowability, but is not effective in manipulating rate of hardening. Dosage of CA is seen to have a large effect on rate of hardening, as well as on initial flowability. Substituting MS and GS for a fractional portion of silica sand content also increases rate of hardening, while maintaining initial flowability. Small amounts of ANC reduced time to hardening via reduced workability, but showed only a slight effect on rate of hardening. For compositional additions or substitutions, water content may need to be adjusted to allow proper mixing and fiber dispersion, which can both affect mechanical performance.

A printable cementitious material design paradigm, based on minimizing workability loss under continued shear agitation, is provided. Purified and exfoliated attapulgite nanoclay is seen to minimize workability loss under relevant processing conditions. The workability loss mitigation provided by ANC is negated when increased rate of hardening caused by excessive CA content dominated. A limited CA content in combination with ANC is recommended to maintain low workability loss for robust printability.

Batch size and temperature of the water content added during processing are seen to be two processing parameters that have a significant effect on fresh state rheological properties. Water temperature can also be used to intentionally manipulate fresh state properties. Both batch size and water temperature can be monitored and controlled for consistent, predictable printing performance.

Compositions exhibiting both extrudability and buildability in the fresh state and interlayer bonding and robust strain-hardening in the cured state are systematically designed and demonstrated on a variety of scales. The mesoscale material structuring produced by the printing process is seen to improve mechanical performance in direct tension due to fiber alignment, without negatively affecting compressive strength.

The early stage properties of the Mix 5 composition provide an advantageous printable composition. Robust tensile strain-hardening behavior of this composition has been confirmed, which will contribute to durability and resilience of the material and structural members produced with it. This printable ECC material exhibits tensile strain capacity of about 4.0%, and tensile strength approaching 6 MPa. Compressive strength for this composition is gained quickly, conservatively measured to reach 30 MPa within 6 days. Extrudability and immediate buildability is observed during a demonstration of an approximated printing process.

A design scheme for self-reinforced cementitious composites is thus provided to be used for building-scale 3D printing processes. The compositions provided herein are 3D printable, but also can be considered to be engineered cementitious composites, which include dispersed short polymer fibers to generate robust tensile strain-hardening. The mechanical property profile of these printable ECC materials can eliminate the need for steel reinforcement in printed structures, providing more freedom and efficiency for building-scale 3D printing processes. The fresh state rheological properties have been systematically manipulated to allow printability. Effects on fresh state workability of several compositional ingredients and processing parameters have been investigated. To maintain consistent printing performance with a batch mixing approach, thixotropy in the fresh state is exploited to temporarily decouple hardening behavior from the processing timeline. Minimal workability loss under continued shear agitation is achieved. Mechanical properties of the printable materials are characterized and the printability of the materials is demonstrated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A printable cementitious composition for additive manufacturing, the composition having a fresh state and a hardened state, wherein in the fresh state the composition is thixotropic, flowable and extrudable in the additive manufacturing process and has a flowability factor of greater than or equal to about 1.1 to less than or equal to about 1.7 and in the hardened state, the composition exhibits strain hardening and has a uniaxial tensile strength of greater than or equal to about 2.5 MPa, a tensile strain capacity of greater than or equal to about 2.5%, and a compressive strength at 100 hours of greater than or equal to about 20 MPa, wherein the composition comprises Portland cement, a calcium aluminate cement, a fine aggregate, water, a high range water reducing agent (HRWRA), a polymeric fiber, and the printable cementitious composition further comprises:

microsilica at greater than or equal to about 2 mass % to less than or equal to about 30 mass % of the total mass of the composition, silica flour present at greater than or equal to about 0.1 mass % to less than or equal to about 5 mass % of the total mass of the composition, and attapulgite nanoclay greater than or equal to 0.5 mass % to less than or equal to about 3 mass % of the total mass of the composition.

2. The printable cementitious composition of claim 1, wherein the Portland cement is present at greater than or equal to about 25 mass % to less than or equal to about 40 mass % of the total mass of the composition, calcium aluminate cement is present at greater than or equal to about 1 mass % to less than or equal to about 4 mass % of the total mass of the composition, the fine aggregate is present at greater than or equal to about 18 mass % to less than or equal to about 35 mass % of the total mass of the composition, water is present at greater than or equal to about 18 mass % to less than or equal to about 30 mass % of the total mass of the composition, the high range water reducing agent (HRWRA) is present at greater than or equal to about 0.2 mass % to less than or equal to about 0.6 mass % of the total mass of the composition, and the polymeric fiber is present at greater than or equal to about 0.7 mass % to less than or equal to about 2.1 mass % of the total mass of the composition.

3. The printable cementitious composition of claim 1, wherein the fine aggregate comprises sand having an average particle size of less than or equal to about 2 mm.

4. The printable cementitious composition of claim 1, wherein the polymer fiber comprises polyvinyl alcohol (PVA).

5. The printable cementitious composition of claim 1, wherein the polymer fiber has a length of greater than or equal to about 5 mm to less than or equal to about 20 mm.

6. The printable cementitious composition of claim 1, further comprising fly ash, hydroxypropylmethyl cellulose (HPMC).

7. The printable cementitious composition of claim 6, wherein the Portland cement is present at greater than or equal to about 25 mass % to less than or equal to about 40 mass % of the total mass of the composition, calcium aluminate cement is present at greater than or equal to about 1 mass % to less than or equal to about 4 mass % of the total mass of the composition, the fine aggregate is present at greater than or equal to about 18 mass % to less than or equal to about 38 mass % of the total mass of the composition, water is present at greater than or equal to about 18 mass % to less than or equal to about 35 mass % of the total mass of the composition, the high range water reducing agent (HRWRA) is present at greater than or equal to about 0.2 mass % to less than or equal to about 0.6 mass % of the total mass of the composition, the polymeric fiber is present at greater than or equal to about 0.7 mass % to less than or equal to about 2.2 mass % of the total mass of the composition, the fly ash is present at greater than or equal to about 5 mass % to less than or equal to about 15 mass % of the total mass of the composition, the silica flour is present at greater than or equal to about 0.1 mass % to less than or equal to about 5.0 mass % of the total mass of the composition, the microsilica is present at greater than or equal to about 2.0 mass % to less than or equal to about 8.0 mass % of the total mass of the composition, the attapulgite nanoclay is present at greater than or equal to about 0.5 mass % to less than or equal to about 3 mass % of the total mass of the composition, the hydroxypropylmethyl cellulose (HPMC) is present at greater than or equal to about 0.05 mass % to less than or equal to about 0.5 mass % of the total mass of the composition.

8. The printable cementitious composition of claim 1 wherein the microsilica is present at greater than or equal to about 4 mass % to less than or equal to about 5 mass % of the total mass of the composition,
the silica flour is present at greater than or equal to about 2 mass % to less than 3 mass % of the total mass of the composition,
the attapulgite nanoclay is present at greater than or equal to about 0.5 mass % to less than or equal to about 3 mass % of the total mass of the composition, and combinations thereof.

9. A method of additive manufacturing comprising:
depositing a cementitious composition in a fresh state by passing the cementitious composition through an aperture to deposit the cementitious composition onto a target, wherein in the fresh state the composition is thixotropic, flowable and extrudable and has a flowability factor of greater than or equal to about 1.1 to less than or equal to about 1.7 and after the depositing, the cementitious composition forms a hardened state exhibiting a uniaxial tensile strength of greater than or equal to about 2.5 MPa, a tensile strain capacity of greater than or equal to about 2.5%, and a compressive strength at 100 hours of greater than or equal to about 20 MPa, wherein the cementitious composition comprises Portland cement, a calcium aluminate cement, a fine aggregate, water, a high range water reducing agent (HRWRA), a polymeric fiber, microsilica at greater than or equal to about 2 mass % to less than or equal to about 30 mass % of the total mass of the composition, silica flour present at greater than or equal to about 0.1 mass % to less than or equal to about 5 mass % of the total mass of the composition, and attapulgite nanoclay at greater than or equal to 0.5 mass % to less than or equal to about 3 mass % of the total mass of the composition.

10. The method of claim 9, wherein the target is a substrate or the target is the cementitious composition in a hardened state that was previously deposited via the additive manufacturing process.

* * * * *